US010740954B2

(12) United States Patent
Liu

(10) Patent No.: US 10,740,954 B2
(45) Date of Patent: Aug. 11, 2020

(54) SHADOW DENOISING IN RAY-TRACING APPLICATIONS

(71) Applicant: NVIDIA Corporation, San Jose, CA (US)

(72) Inventor: Shiqiu Liu, Santa Clara, CA (US)

(73) Assignee: NVIDIA Corporation, Santa Clara, CA (US)

( * ) Notice: Subject to any disclaimer, the term of this patent is extended or adjusted under 35 U.S.C. 154(b) by 0 days.

(21) Appl. No.: 16/354,983

(22) Filed: Mar. 15, 2019

(65) Prior Publication Data

US 2019/0287291 A1    Sep. 19, 2019

Related U.S. Application Data

(60) Provisional application No. 62/644,385, filed on Mar. 17, 2018, provisional application No. 62/644,386, (Continued)

(51) Int. Cl.
*G06T 15/60*    (2006.01)
*G06T 15/06*    (2011.01)
(Continued)

(52) U.S. Cl.
CPC .............. *G06T 15/06* (2013.01); *G06T 5/002* (2013.01); *G06T 5/20* (2013.01); *G06T 15/506* (2013.01); *G06T 15/60* (2013.01); *G06T 2210/21* (2013.01)

(58) Field of Classification Search
CPC ........... G06T 5/002; G06T 5/20; G06T 15/06; G06T 15/506; G06T 15/60
See application file for complete search history.

(56) References Cited

U.S. PATENT DOCUMENTS

| 5,808,620 A | 9/1998 | Doi et al. |
| 6,028,608 A | 2/2000 | Jenkins |

(Continued)

FOREIGN PATENT DOCUMENTS

| CN | 102346919 B | 8/2013 |
| CN | 106228599 A | 12/2016 |

(Continued)

OTHER PUBLICATIONS

Y Tokuyoshi: "Computer Graphics forum Specular Lobe-Aware Filtering and Upsampling for Interactive Indirect Ilumination", pp. 1-12, XP055582445, Retrieved from the Internet: URL:http://www.jp.square-enix.com/tech/library/pdf/Specular%20Lobe-Aware%20Filtering%20and%20Upsampling%20for%20Interactive%20Indirect%20Illumination.pdf, 2015.

(Continued)

*Primary Examiner* — Charles Tseng
(74) *Attorney, Agent, or Firm* — Shook, Hardy & Bacon, L.L.P.

(57) ABSTRACT

In various examples, the actual spatial properties of a virtual environment are used to produce, for a pixel, an anisotropic filter kernel for a filter having dimensions and weights that accurately reflect the spatial characteristics of the virtual environment. Geometry of the virtual environment may be computed based at least in part on a projection of a light source onto a surface through an occluder, in order to determine a footprint that reflects a contribution of the light source to lighting conditions of the pixel associated with a point on the surface. The footprint may define a size, orientation, and/or shape of the anisotropic filter kernel and corresponding filter weights. The anisotropic filter kernel may be applied to the pixel to produce a graphically-rendered image of the virtual environment.

20 Claims, 12 Drawing Sheets

Related U.S. Application Data filed on Mar. 17, 2018, provisional application No. 62/644,601, filed on Mar. 19, 2018, provisional application No. 62/718,923, filed on Aug. 14, 2018.

(51) Int. Cl.
  *G06T 5/00* (2006.01)
  *G06T 5/20* (2006.01)
  *G06T 15/50* (2011.01)

(56) References Cited

U.S. PATENT DOCUMENTS

| | | | |
|---|---|---|---|
| 6,229,553 | B1 | 5/2001 | Duluk et al. |
| 6,335,990 | B1 | 1/2002 | Chen et al. |
| 6,430,318 | B1 | 8/2002 | Florent et al. |
| 7,034,892 | B2 | 4/2006 | Ojo et al. |
| 7,199,838 | B2 | 4/2007 | Lin et al. |
| 8,130,244 | B2 | 3/2012 | Cooper |
| 8,139,059 | B2 | 3/2012 | Trepte |
| 8,264,546 | B2 | 9/2012 | Witt |
| 8,447,130 | B2 | 5/2013 | Chiu |
| 8,471,932 | B2 | 6/2013 | Cote et al. |
| 9,423,611 | B2 | 8/2016 | Yagi |
| 9,659,405 | B2 | 5/2017 | Wahrenberg |
| 9,778,815 | B2 | 10/2017 | Motta et al. |
| 9,871,948 | B2 | 1/2018 | Papadopoulos et al. |
| 9,892,549 | B2 | 2/2018 | Mitchell et al. |
| 9,961,319 | B2 | 5/2018 | Tajima |
| 2004/0160441 | A1* | 8/2004 | Lokovic .......... G06T 15/06 345/426 |
| 2008/0174600 | A1* | 7/2008 | Xie .............. G06T 15/60 345/426 |
| 2010/0134688 | A1 | 6/2010 | Moriwake |
| 2014/0192054 | A1 | 7/2014 | Yoo et al. |
| 2014/0313200 | A1 | 10/2014 | Tokuyoshi |
| 2015/0131922 | A1 | 5/2015 | Simson |
| 2015/0208054 | A1 | 7/2015 | Michot |
| 2015/0325041 | A1 | 11/2015 | Ha et al. |
| 2016/0171748 | A1 | 6/2016 | Kohlbrenner et al. |
| 2016/0260245 | A1 | 9/2016 | Decell et al. |
| 2016/0269723 | A1 | 9/2016 | Zhou |
| 2016/0307324 | A1 | 10/2016 | Nakada et al. |
| 2017/0032500 | A1* | 2/2017 | Csefalvay .......... G06T 5/002 |
| 2017/0243396 | A1 | 8/2017 | Kim et al. |
| 2017/0323471 | A1 | 11/2017 | Chien |
| 2018/0114096 | A1 | 4/2018 | Sen et al. |
| 2018/0192497 | A1 | 7/2018 | Green et al. |
| 2018/0255625 | A1 | 9/2018 | Lashina et al. |
| 2018/0293496 | A1 | 10/2018 | Vogels |
| 2018/0315251 | A1 | 11/2018 | Sun et al. |

FOREIGN PATENT DOCUMENTS

| | | |
|---|---|---|
| CN | 104346831 B | 2/2017 |
| CN | 106485778 A | 3/2017 |
| EP | 2158948 A2 | 3/2010 |
| EP | 2058764 B1 | 9/2017 |
| JP | 2003331313 A | 11/2003 |
| KR | 101508386 B1 | 4/2015 |
| WO | 20182024435 A1 | 11/2018 |

OTHER PUBLICATIONS

Soonhyun Kim et al: "Noiseless GPU rendering of isotropic BRDF surfaces", The Visual Computer; International Journal of Computer Graphics, Springer, Berlin, DE, vol. 28, No. 1, Sep. 13, 2011 (Sep. 13, 2011), pp. 125-135, XP019998749, ISSN: 1432-2315, DOI:10.1007/S00371-011-0633-4 abstract, p. 130.

International Search Report and Written Opinion dated Apr. 30, 2019 in International Patent Application No. PCT/US2019/022577, 15 pages.

International Search Report and Written Opinion dated May 14, 2019 in International Patent Application No. PCT/US2019/022543, 12 pages.

Dundr, Jan, "Progressive spatiotemporal variance-based path tracing filtering", May 2018, Master Thesis, Czech Technical University in Prague.

Mara, Michael, Morgan McGuire, Benedikt Bitterli, and Wojciech Jarosz. "An efficient denoising algorithm for global illumination." In High Performance Graphics, pp. 3-1. 2017.

Bauszat, P., Eisemann, M., John, S., & Magnor, M. (Feb. 2015). "Sample-based manifold filtering for interactive global illumination and depth of field." In Computer Graphics Forum (vol. 34, No. 1, pp. 265-276).

Schied, Christoph, Christoph Peters, and Carsten Dachsbacher. "Gradient Estimation for Real-Time Adaptive Temporal Filtering." Proceedings of the ACM on Computer Graphics and Interactive Techniques 1.2 (2018): 24.

Xu, Ruifeng, and Sumanta N. Pattanaik. "A novel Monte Carlo noise reduction operator." IEEE Computer Graphics and Applications 25, No. 2 (2005): 31-35.

Viitanen, T., Koskela, M., Immonen, K., Mäkitalo, M., Jääskeläinen, P., & Takala, J. (2018). "Sparse Sampling for Real-time Ray Tracing." In VISIGRAPP (1: GRAPP) (pp. 295-302).

Hees, H. "3D Computer Graphics." Mainz: Pediapress. Dipetik5 (2016). (uploaded in five parts).

Atty, Lionel, et al. "Soft shadow maps: Efficient sampling of light source visibility." Computer graphics forum. vol. 25. No. 4. Oxford, UK: Blackwell Publishing Ltd, 2006.

Tunnel, Raimond, Jaanus Jaggo, "Computer Graphics Learning—Shadows", Accessed Mar. 1, 2019 at: https://cglearn.eu/pub/computer-graphics/shadows.

Mehta, S. U., Wang, B., Ramamoorthi, R., & Durand, F. (2013). "Axis-aligned filtering for interactive physically-based diffuse indirect lighting." ACM Transactions on Graphics (TOG), 32(4), 96.

Mehta, Soham Uday, Brandon Wang, and Ravi Ramamoorthi. "Axis-aligned filtering for interactive sampled soft shadows." ACM Transactions on Graphics (TOG) 31.6 (2012): 163.

Ex Parte Quayle Action for U.S. Appl. No. 16/355,214, dated Mar. 9, 2020.

Notice of Allowance for U.S. Appl. No. 16/355,214, dated Apr. 22, 2020.

\* cited by examiner

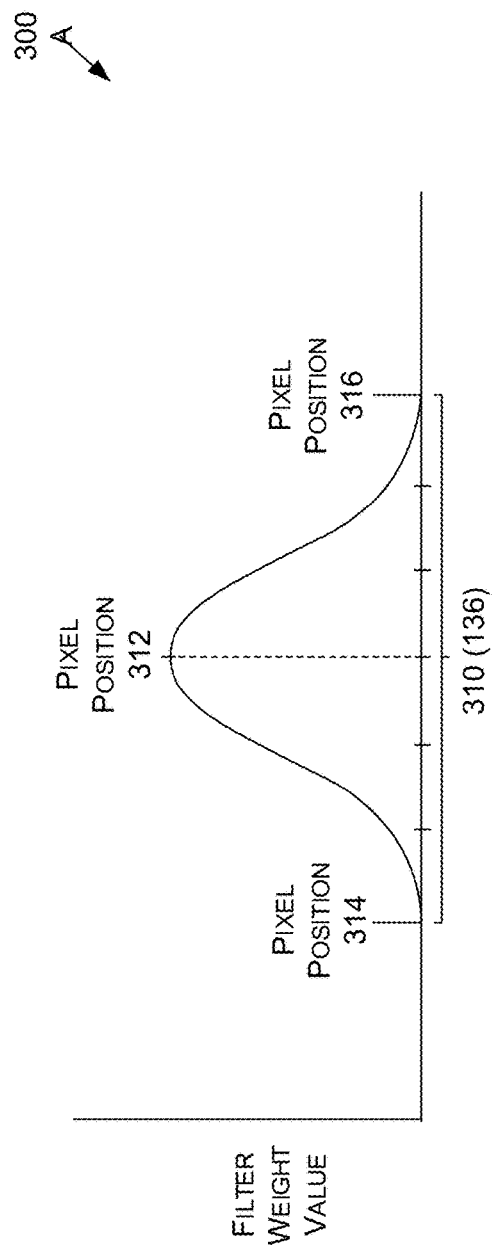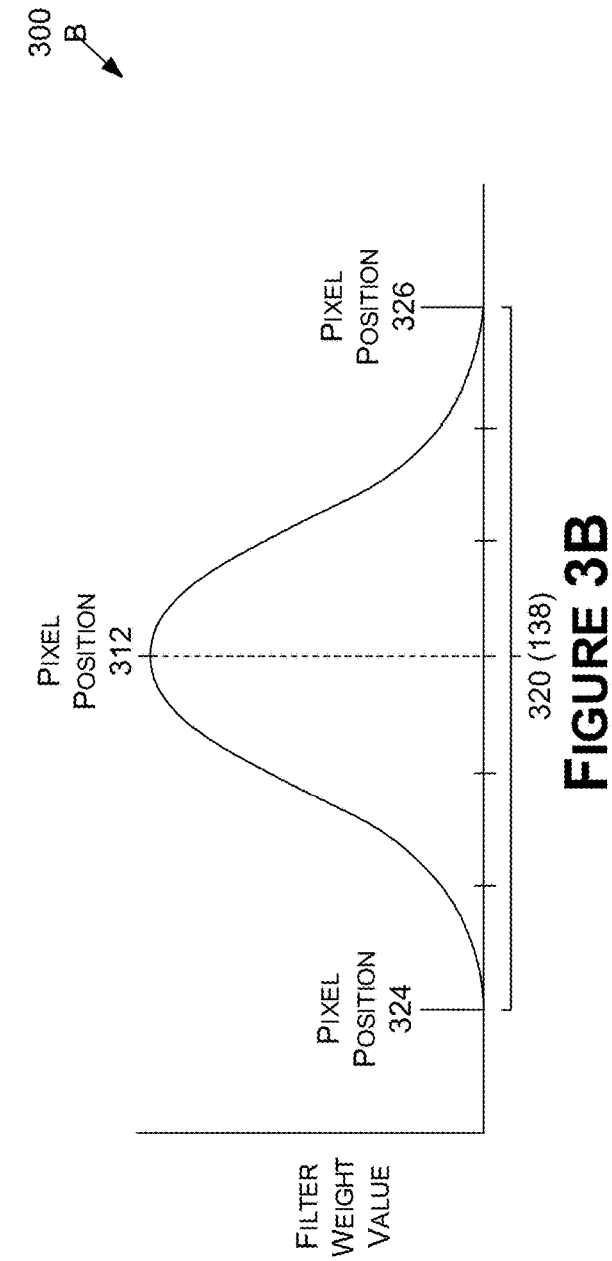

700

```
┌─────────────────────────────────────────────┐
│ DETERMINE A FIRST GEOMETRY THAT CORRESPONDS TO A │
│ 3D SHAPE PROJECTED FROM A LIGHT SOURCE TOWARD A │
│                    POINT                    │
│                    B702                     │
└─────────────────────────────────────────────┘
                       │
                       ▼
┌─────────────────────────────────────────────┐
│ DETERMINE A SECOND GEOMETRY OF A FOOTPRINT THAT │
│ CORRESPONDS TO A FIRST SECTION OF THE 3D SHAPE │
│                    B704                     │
└─────────────────────────────────────────────┘
                       │
                       ▼
┌─────────────────────────────────────────────┐
│   DETERMINE AT LEAST ONE DIMENSION OF A FILTER   │
│                    B706                     │
└─────────────────────────────────────────────┘
                       │
                       ▼
┌─────────────────────────────────────────────┐
│    APPLY THE FILTER TO AN IMAGE OF A VIRTUAL    │
│                 ENVIRONMENT                 │
│                    B708                     │
└─────────────────────────────────────────────┘
```

FIGURE 7

SHADOW DENOISING IN RAY-TRACING APPLICATIONS

CROSS-REFERENCE TO RELATED APPLICATIONS

This application claims the benefit of U.S. Provisional Application No. 62/644,385, filed on Mar. 17, 2018, which is hereby incorporated by reference in its entirety. This application also claims the benefit of U.S. Provisional Application No. 62/644,386, filed on Mar. 17, 2018, which is hereby incorporated by reference in its entirety. This application further claims the benefit of U.S. Provisional Application No. 62/644,601, filed on Mar. 19, 2018, which is hereby incorporated by reference in its entirety. This application further claims the benefit of U.S. Provisional Application No. 62/718,923, filed on Aug. 14, 2018, which is hereby incorporated by reference in its entirety.

BACKGROUND

Ray-tracing may be used to render images by tracing a path of light in a virtual environment and simulating the effects of the light's encounters with virtual objects. Various applications of ray-tracing technology may include simulating a variety of optical effects—such as shadows, reflections and refractions, scattering phenomenon, and dispersion phenomenon (such as chromatic aberration). With respect to rendering soft shadows using ray-tracing, conventional approaches typically use a technique referred to as stochastic ray-tracing, in which ray-traced view vectors and shadow rays are cast in a virtual environment to sample lighting conditions a pixel. The lighting conditions may be combined and applied to the pixel in an image. To conserve computing resources and rendering times, the rays may be sparsely sampled, resulting in a noisy render. The noisy render may then be filtered to reduce noise and produce a final render that approximates a render of a fully-sampled scene.

In order for the final render to accurately portray lighting conditions in the virtual environment after filtering, conventional approaches require a large number of ray-traced samples (e.g., hundreds if not thousands of samples or more) for each pixel. Due to the large number of samples, the computational resources used for rendering the virtual environment may impose too great of a delay for real-time rendering applications, such as gaming. In one such approach, a complex frequency space analysis is performed for the pixel to determine an isotropic filter kernel that is computed under various assumptions about the characteristics of the virtual environment. Examples of such assumptions are that each light source acts like a rectangular light source, and that each light source is always parallel to the receiver plane. However, when the assumptions are incorrect the dimensions (e.g., size, shape, orientation) and the weights of the filter kernel do not accurately reflect the spatial characteristics of the virtual environment which may cause over-blurring of the image as well as an unrealistic blur pattern.

SUMMARY

Embodiments of the present disclosure relate to shadow denoising in ray-tracing applications. In particular, the present disclosure relates to approaches for denoising ray-traced soft shadows that may be cast by various types of light sources. More specifically, the current disclosure relates to approaches for determining the dimensions and filter weights of a filter kernel that is applied to a pixel to denoise the ray-traced soft shadows in a graphically-rendered image.

Disclosed approaches may leverage the actual spatial properties of a virtual environment—such as the size and shape of a light source, and its position relative to an occluder, an occluded surface, a virtual screen, and a virtual camera—to produce, for a pixel, an anisotropic filter kernel having dimensions and weights that accurately reflect the spatial characteristics of the virtual environment. This may not only reduce the chance of over-blurring of the image, but may also result in a more realistic blur pattern. In order to accomplish this, various examples may compute geometry of the virtual environment based at least in part on a projection of the light source onto a surface through an occluder, in order to determine a footprint that reflects a contribution of the light source to lighting conditions of a pixel associated with a point on the surface. The footprint may define a size, orientation, and/or shape of an anisotropic filter kernel of a filter and corresponding filter weights of the filter.

BRIEF DESCRIPTION OF THE DRAWINGS

The present systems and methods for shadow denoising in ray-tracing applications are described in detail below with reference to the attached drawing figures, wherein:

FIG. 3A is a diagram illustrating an example of a graph of filter weight values that may be determined by fitting a distribution function to a first width of a filter along a first direction, in accordance with some embodiments of the present disclosure;

FIG. 3B is a diagram illustrating an example of a graph of filter weight values that may be determined by fitting a distribution function to a second width of the filter of FIG. 3B along a second direction, in accordance with some embodiments of the present disclosure;

FIG. 7 is a flow diagram showing a method for determining a filter for denoising soft shadows, in accordance with some embodiments of the present disclosure;

DETAILED DESCRIPTION

The present disclosure relates to approaches for denoising ray-traced soft shadows cast by various types of light sources. More specifically, the current disclosure relates to approaches for determining the size, shape, filter directions, and/or filter weights of a filter kernel that is applied to a pixel to denoise the ray-traced soft shadows in a graphically-rendered image.

In contrast to traditional approaches, disclosed approaches may leverage the actual spatial properties of a virtual environment—such as the size and shape of a light source, and its position relative to an occluder, an occluded surface, a virtual screen, and a virtual camera—to produce, for a pixel, an anisotropic filter kernel having a size and weights that accurately reflect the spatial characteristics of the virtual environment. This may not only reduce the chance of over-blurring of the image, but may also result in a more realistic blur pattern. Thus, a small amount of spatial ray-traced samples (e.g., a single spatial ray-traced sample) may be used for each pixel, while the pixel may still accurately visualize lighting conditions in a virtual environment. This may reduce render times and be suitable for real-time rendering applications, such as gaming.

In order to accomplish this, examples of the current system may compute a first geometry of a three dimensional (3D) shape projected from a light source toward a point in the virtual environment, where the point intersects a view vector of a virtual camera that passes through a virtual pixel of a virtual screen. Using the first geometry of the 3D shape, a second geometry of a footprint that corresponds to a first cross-section of the 3D shape may be computed based at least in part on a distance between the point and an occluder of the light source. Using the second geometry of the footprint of the 3D shape, a third geometry of an anisotropic filter (and/or other dimensions) may be computed that corresponds to a second cross-section of a projection of the footprint along the view vector of the point to the virtual pixel.

A size, orientation, and/or shape of the anisotropic filter kernel and corresponding filter weights of the filter may be determined from the third geometry. For example, the size of the anisotropic filter kernel may match the second cross-section at the virtual screen, or may be adjusted based on other information, such as temporal ray-traced sample information from concurrent or preceding frames. Further, the filter weights may be determined by applying a distribution function, such as a Gaussian distribution function, along each filter direction of the anisotropic filter kernel.

Figure 1:
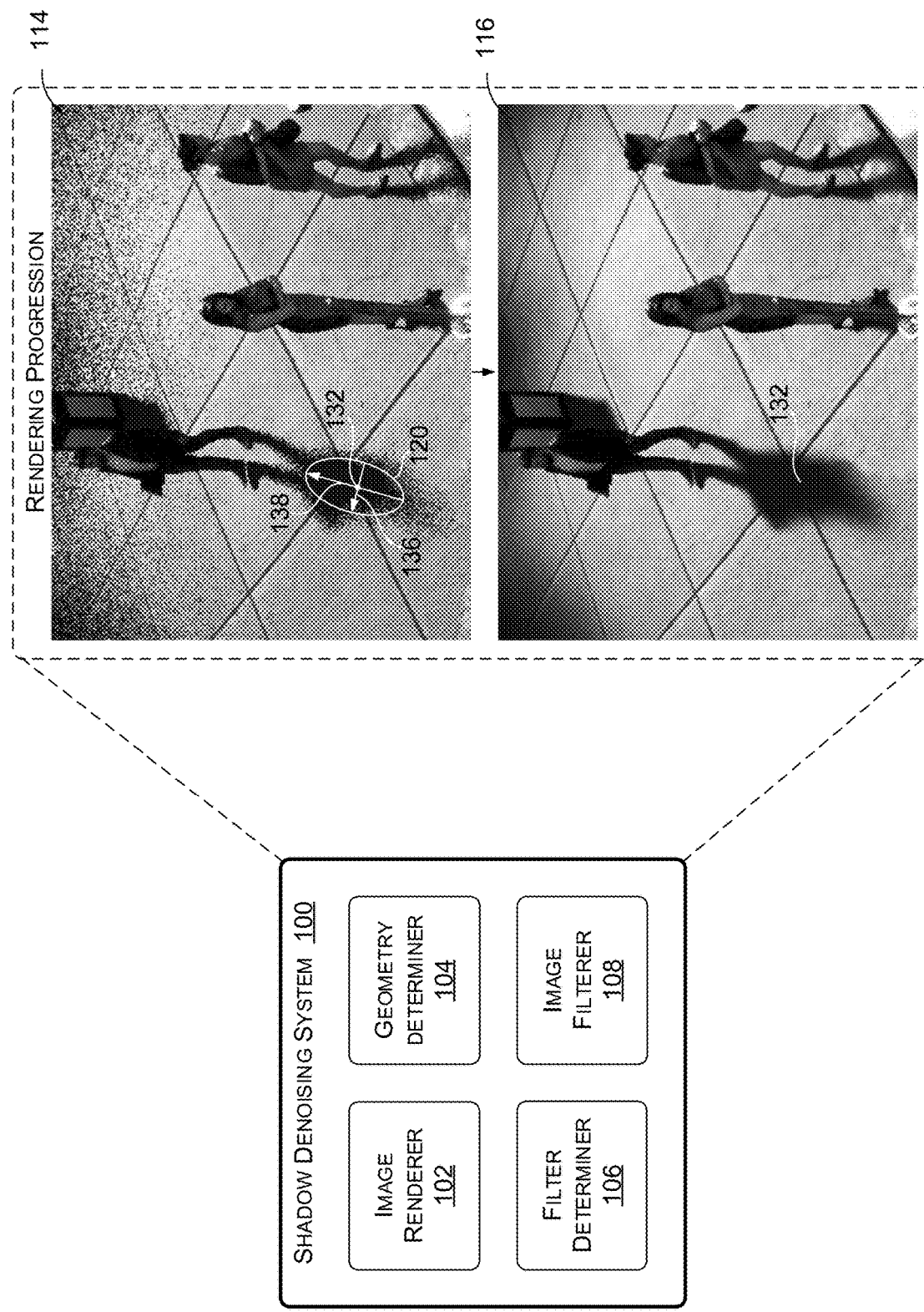
FIG. 1 is an example system diagram of a shadow denoising system, in accordance with some embodiments of the present disclosure.

With reference to FIG. 1, FIG. 1 is an example system diagram of a shadow denoising system 100, in accordance with some embodiments of the present disclosure. It should be understood that this and other arrangements described herein are set forth only as examples. Other arrangements and elements (e.g., machines, interfaces, functions, orders, groupings of functions, etc.) may be used in addition to or instead of those shown, and some elements may be omitted altogether. Further, many of the elements described herein are functional entities that may be implemented as discrete or distributed components or in conjunction with other components, and in any suitable combination, arrangement, or location. Various functions described herein as being performed by entities may be carried out by hardware, firmware, and/or software. For instance, various functions may be carried out by a processor executing instructions stored in memory.

The shadow denoising system 100 may include, among other things, an image renderer 102, a geometry determiner 104, a filter determiner 106, and an image filterer 108. The image renderer 102 may be configured to render images of virtual environments, such as a virtual environment 200 of FIGS. 2A-2D. To render an image of a virtual environment, the image renderer 102 may employ the geometry determiner 104, the filter determiner 106, and the image filterer 108. The geometry determiner 104 may be configured to determine, for a point in a virtual environment, geometries that correspond to a 3D shape projected from a light source in the virtual environment toward the point. The filter determiner 106 may be configured to determine—based at least in part on one or more of the geometries—at least one dimension (e.g., size, shape, orientation) of a filter 120 (e.g., a spatial filter) and corresponding filter weights of the filter 120. The image renderer 102 may apply the filter 120 to a pixel 132 (e.g., at an initial pixel position of the filter 120) that corresponds to the point in the virtual environment to denoise an image 114 that is representative of the virtual environment. The image renderer 102 may similarly use the geometry determiner 104, the filter determiner 106, and the image filterer 108 to determine filters for other points in the virtual environment and corresponding pixels in the image 114 to produce the image 116. Further, where the virtual environment includes multiple light sources, the image renderer 102 may use the geometry determiner 104, the filter determiner 106, and the image filterer 108 for each light source. Thus, multiple light sources and corresponding filters may be used for the same pixel to produce the image 116 (e.g., one filter per light source), and those filters may all be applied in a single draw call.

While the image renderer 102 is described as rendering the image 114, the various examples described herein are not intended to be limited to rendering the image 114. For example, the image 114 need not be fully rendered as shown. As an example, one or more portions of visual content of the image 114 and/or components thereof may be rendered. The image filterer 108 may apply filters to image data representative of the one or more portions of visual content of the image 114 and/or components thereof to produce image data representative of the image 116. The image 114 is shown to illustrate noise that may be filtered in some examples of the present disclosure. Further, while the filter 120 is illustrated in FIG. 1, the image renderer 102 may or may not render an illustration of the filter 120 in the image data.

Figure 2A:
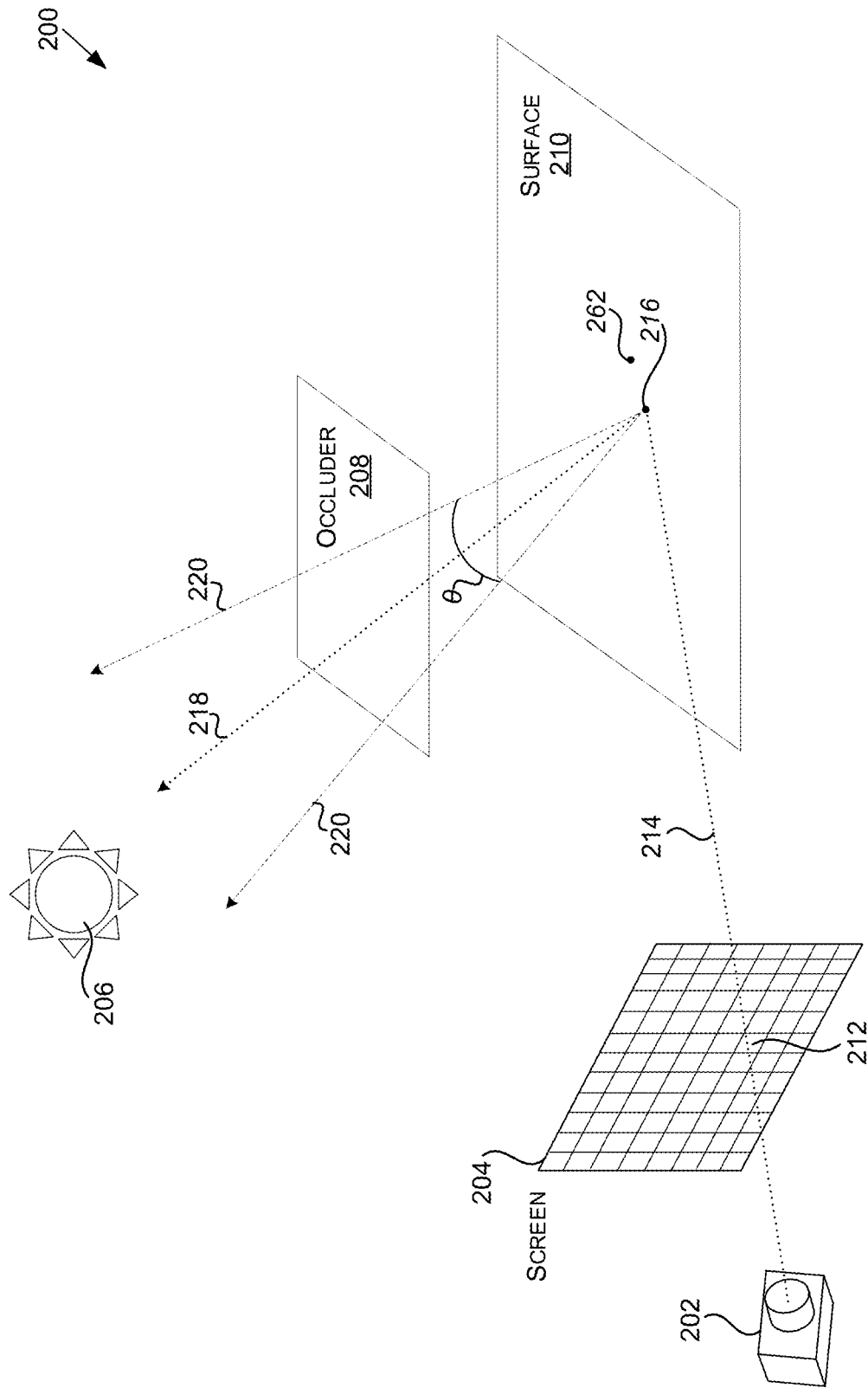
FIG. 2A is a diagram illustrating an example of a 3D shape, which may be used to determine a filter for denoising soft shadows based at least in part on a light source, in accordance with some embodiments of the present disclosure.

The image renderer 102 may render the image 114 (and/or portions or components thereof) using any suitable approach for ray-tracing shadows, such as stochastic ray-tracing. Examples of stochastic ray-tracing techniques that may be used by the image renderer 102 include those that employ Monte Carlo or quasi-Monte Carlo sampling strategies. FIG. 2A is used to further describe examples of suitable ray-tracing approaches that may be employed by the image renderer 102. Referring now to FIG. 2A with FIG. 1, FIG.

2A is a diagram illustrating an example of a 3D shape 220, which may be used to determine the filter 120 for denoising soft shadows based at least in part on a light source 206, in accordance with some embodiments of the present disclosure.

FIG. 2A shows the virtual environment 200 including a camera 202, a screen 204, the light source 206, an occluder 208, and a surface 210. The screen 204 is a virtual representation of a screen which may or more not be the same resolution as the image 114 and/or the image 116. The screen 204 may include a matrix of virtual pixels or regions, of which a pixel 212 is individually labeled. To determine at least some lighting condition data for the pixel 212, the image renderer 102 may cast any number of rays (e.g., one or more)—such as a ray 214—through a pixel 212 of the screen 204 to sample lighting conditions for the pixel 212. These rays may be referred to as camera rays, eye rays, or primary rays, as examples. The image renderer 102 may use the camera rays to determine visible points in the environment that may be affected by the light source 206. For example, the image renderer 102 may use the ray 214 to determine a point 216 (e.g., a shading point) on or near the surface 210. In such an example, the image renderer 102 may determine the point 216 as the location where the ray 214 intersects with the surface 210 (or the point 216 may otherwise be based at least in part on that location). Although the ray 214 intersects with the surface 210, in examples where more than one ray is cast, not all rays may intersect with a surface.

From each point in the virtual environment 200 that the image renderer 102 determines using a ray cast through the pixel 212, any number of rays (e.g., one or more)—such as a ray 218—may be cast to sample visibility and lighting conditions of the point with respect to the light source 206. These rays may be referred to as shadow rays, or secondary rays, as examples. The image renderer 102 may determine at least some lighting condition data for the pixel 212 by combining (e.g., averaging) the lighting condition data derived from the various ray-traced samples. The image renderer 102 may similarly determine at least some lighting condition data for each pixel or region of the screen 204 (e.g., using any number of shadow rays and camera rays). In some examples, one or more shadow rays may be cast for each light source in the virtual environment 200 to determine a contribution of the light source to the lighting conditions for a pixel.

The image renderer 102 may use the lighting condition data for each pixel to render one or more corresponding pixels of the image 116. Generally, the accuracy of the lighting conditions that the image renderer 102 computes for a pixel with respect to a light source may increase with the number of camera and/or shadow rays used to sample the lighting conditions. However, the computing resources used to determine the lighting conditions also may increase with the number of rays, which may increase render times.

To preserve computing resources and to reduce render times, the number of rays used to sample lighting conditions may be below what is needed for shadow quality to converge to an ideal ray-traced result. This may result in the image renderer 102 generating lighting condition data that includes noisy shadow image data, as indicated in the image 114. The image 114 is an example in which the lighting conditions of each pixel of the screen 204 with respect to the light source 206 is based on a single ray-traced sample of a state of the virtual environment 200 (e.g., comprising a single camera or eye ray and a single shadow ray for the light source 206). As indicated, the noisy shadow image data may be noticeable in the penumbra of a shadow where individual ray-traced samples may have a larger impact on lighting conditions (e.g., due to partial visibility with respect to a light source).

To reduce noise in the lighting condition data for the pixels, the image renderer 102 may filter the lighting condition data to render the image 116. In FIG. 1, the filter 120 is indicated in image or screen space relative to the image 114 to show an example of a filter that the image renderer 102 may use to filter the lighting condition data. In some examples, the filter determiner 106 may determine a filter for each pixel of the screen 204, the image 114, and/or the image 116 and/or for each light source in the virtual environment 200 that may impact lighting conditions thereof. The image renderer 102 may apply the filters to the lighting condition data at image (e.g., pixel) locations corresponding to the associated pixels to render the image 116. In various examples, one or more of the filters may be applied in parallel. Further, each filter (e.g., the filter 120) may be applied as a separable filter that comprises multiple sub-filters that may be applied in multiple passes. Additionally, while examples of information used to determine properties of the filter 120 are provided, additional information may be used that results in corresponding adjustments to the properties (e.g., dimensions) of the filter 120. Further in some examples, the filter 120 may be incorporated into one or more other filters.

Using approaches described herein, the image renderer 102 may apply the filters such that the image 116 accurately reflects the lighting conditions for the virtual environment 200. Due to the quality of the filters, the image 116 may accurately reflect the lighting conditions for the virtual environment 200 even where the number of rays used to sample the lighting conditions is low. For example, only one camera ray and shadow ray may be used per-pixel and per-light source while achieving accurate soft shadows.

The filter 120—and other filters described herein—may comprise a filter kernel and one or more filter directions. The filter kernel of a filter may refer to a matrix (e.g., rectangular array) that defines one or more convolutions for processing image data of an image to alter one or more characteristics of the image, such as shades and colors of the pixels of the image. In some examples, a filter kernel may be applied as a separable filter in which the matrix may be represented using multiple sub-matrices, or filters, that may be applied to an image in multiple passes. When determining or computing a filter kernel for a separable filter, the disclosure contemplates that the sub-matrices may be directly computed, or may be derived from another matrix.

Each element of a matrix of a filter kernel may represent a respective pixel position. One of the pixel positions of a matrix may represent an initial pixel position that corresponds to a pixel to which the filter is applied and is typically located at the center of the matrix. For example, when applying the filter 120 to the pixel 132 of the image 114, the pixel 132 may be used as the initial pixel position. A filter direction may define the alignment of the matrix relative to the image and/or pixel to which the filter is applied. Thus, when applying a filter to a pixel, other pixels for other pixel positions of a matrix of a filter kernel may be determined relative to the initial pixel position using the filter direction. For example, the filter 120 may be a separable filter that comprises two sub-matrices with one matrix having the filter direction 136 and the other matrix having the filter direction 138.

Each element of a matrix of a filter kernel may comprise a filter weight for the pixel position. The matrix may be applied to an image using convolution, in which a data value for each pixel of the image that corresponds to a pixel position of the matrix may be added to data values for pixels that correspond to the local neighbors in the matrix, weighted by the filter values (also referred to as filter weights). As described herein, the filter values may be configured to blur the pixels, such as by fitting a Gaussian distribution(s) a size of the filter kernel (e.g., to a width and a height).

The data values to which a filter applied may correspond to lighting condition data of the pixels. Thus, applying a matrix of a filter kernel to a pixel may cause the lighting condition data to be at least partially shared amongst the pixels that correspond to the pixel positions of the filter kernel. The sharing of the lighting condition data may mitigate noise due to sparsely sampling lighting conditions in ray-tracing when the filter kernel accurately defines which pixels may share lighting condition data (e.g., via the size of the matrix and filter direction(s)) and how much lighting condition data may be shared (e.g., via the filter weights). As such, where the size, filter direction(s), and/or filter weights of the filter kernel do not accurately reflect lighting conditions of a virtual environment, the filter kernel may cause over-blurring and/or unrealistic blurring, resulting in unrealistic lighting conditions being represented in a rendered image.

Conventional approaches for denoising ray-traced shadows compute an isotropic filter kernel which is always circularly symmetric, and often does not correspond to the footprint of a light source in a virtual environment. Using the isotropic filter kernel for a filter may result in unrealistic blurring where either too few or too many pixels are blurred by the filter, and where the filter values of the filter do not result in lighting condition data being shared amongst pixels in a realistic manner. In various examples, the present disclosure may provide approaches for computing an anisotropic filter kernel that may be elongated so that a size of the filter kernel extends farther along a first axis than along a second axis to more closely reflect the footprint of a light source in a virtual environment.

Further, conventional approaches for denoising ray-traced shadows use frequency space analysis to compute the isotropic filter kernel under various assumptions about the characteristics of the virtual environment. Examples of such assumptions are that each light source acts like a rectangular light source, and that each light source is always parallel to the receiver plane. However, when the assumptions are incorrect the dimensions and the weights of the filter kernel do not accurately reflect the spatial characteristics of the virtual environment (e.g., the footprint of a light source), which may cause over-blurring of the image as well as an unrealistic blur pattern. Disclosed approaches may use a geometric analysis of a virtual environment to leverage the actual spatial properties of the virtual environment in computing a filter kernel. Thus, disclosed approaches may be used to compute an anisotropic filter kernel or an isotropic filter kernel that has one or more dimensions that accurately reflects the spatial characteristics of the virtual environment. FIGS. 2A-2D are used to illustrate examples of the filter determiner 106 determining the filter 120 based on the pixel 212 of the screen 204. A similar approach may be used for each pixel of the screen 204 and/or each light source of the virtual environment 200. The filter determiner 106 may compute geometry of the virtual environment 200 to determine one or more dimensions and/or filter weights of the filter 120, such that the filter 120 accurately captures the contribution of the light source 206 at the point 216 to the lighting conditions of the pixel 212.

To determine a dimension(s) of the filter 120, the filter determiner 106 may compute one or more corresponding dimensions of a footprint 230 (shown in FIGS. 2B and 2C) in a world space of the virtual environment 200 using geometry of the virtual environment 200. The dimension(s) of the footprint 230 may be used to determine the dimension(s) of the filter 120 in image space, as indicated in FIG. 2C. By computing the dimension(s) of the filter 120 using geometry of the virtual environment 200, the dimension(s) may accurately reflect a region around the point 216 in which the light source 206 may contribute to lighting conditions of the pixel 212. For example, the region may be sized and shaped to correspond to the potential distribution of points in the virtual environment that may contribute to lighting conditions at the pixel 212 with respect to the light source 206 and the camera 202.

Further, in various examples, the footprint 230 may be an anisotropic footprint that it is elongated in a direction from the point 216 towards the light source 206. This may result in the filter 120 being an anisotropic filter such that the shape of the filter 120 may accurately reflect a shape of the region around the point 216 in which the light source 206 may contribute to lighting conditions of the pixel 212.

Figure 2B:
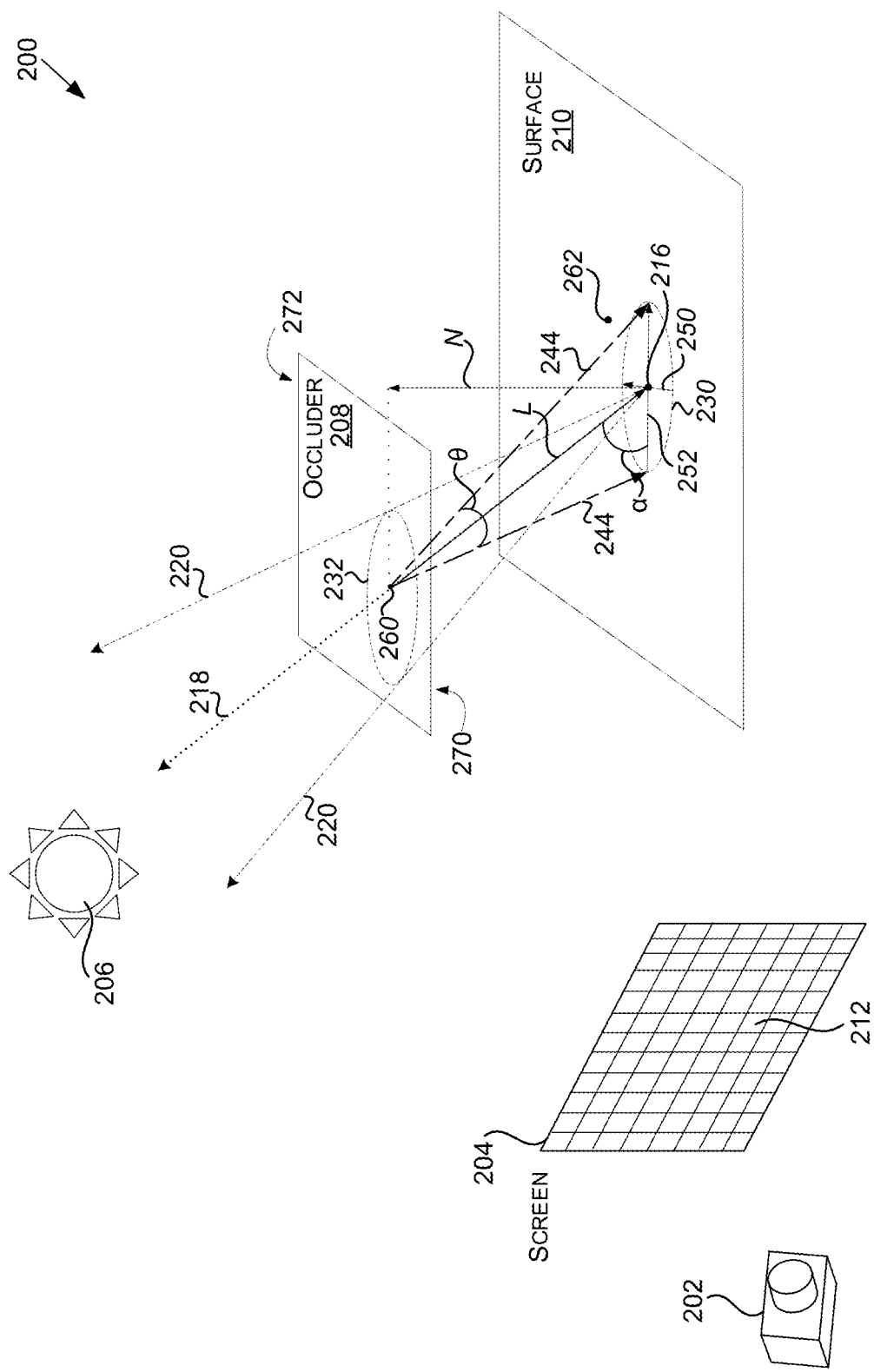
FIG. 2B is a diagram illustrating an example of inverting a 3D shape, which may be used to determine a filter for denoising soft shadows based at least in part on a light source, in accordance with some embodiments of the present disclosure.
Figure 2C:
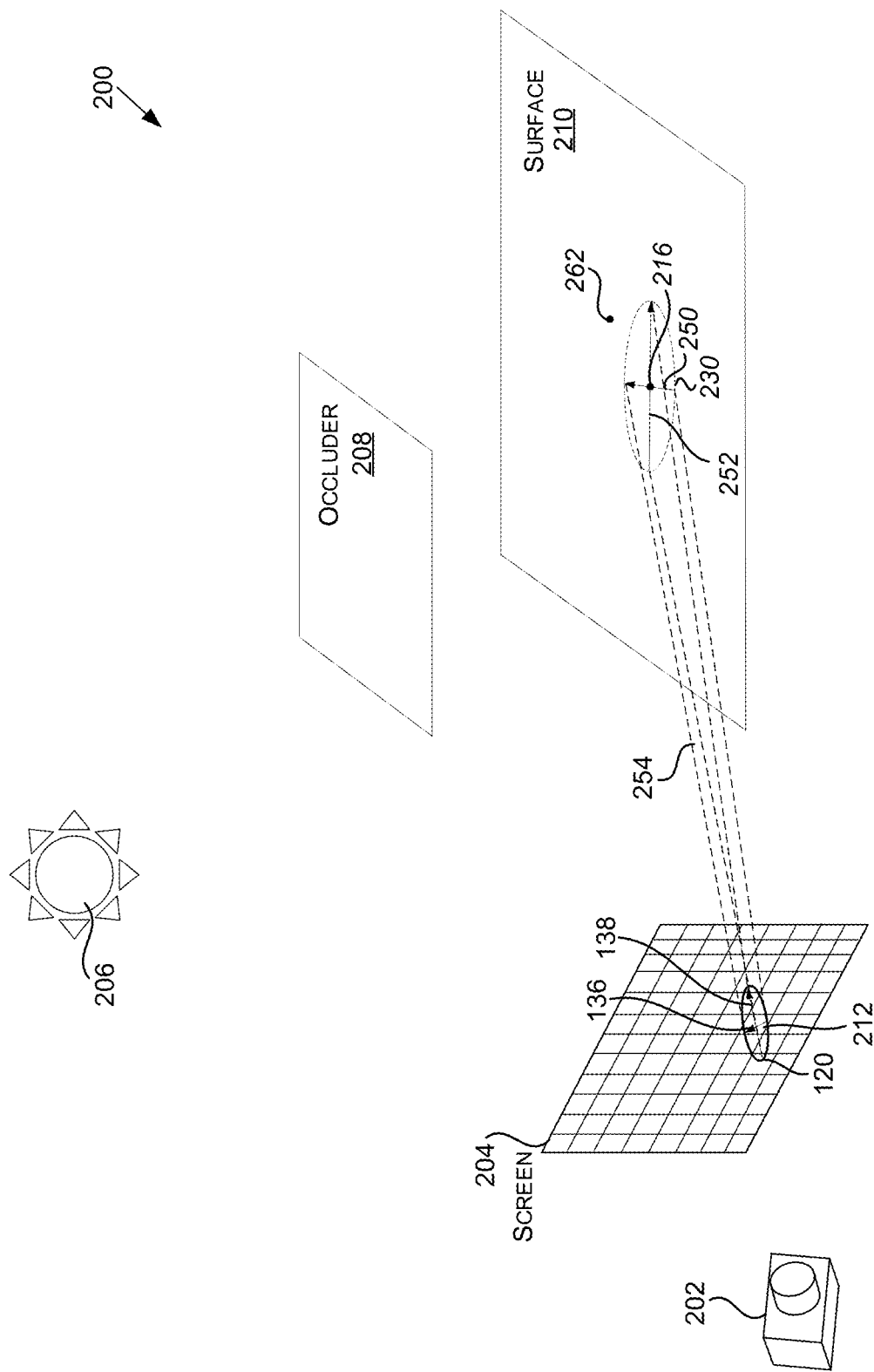
FIG. 2C is a diagram illustrating an example of projecting a filter from a world space to an image space, in accordance with some embodiments of the present disclosure.
Figure 2D:
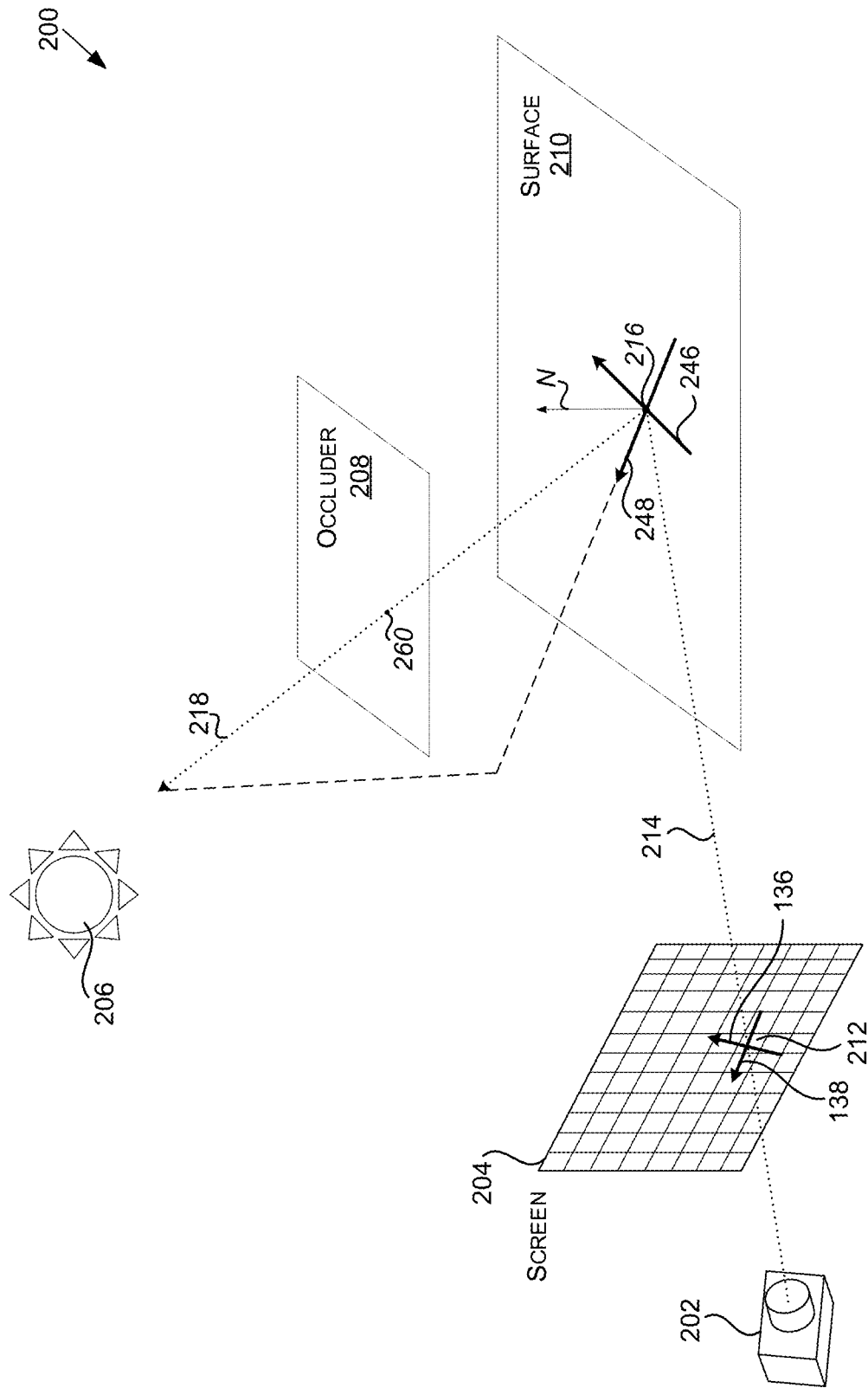
FIG. 2D is a diagram illustrating an example of determining at least one filter direction for a filter, in accordance with some embodiments of the present disclosure.

Additionally, the filter determiner 106 may compute one or more of filter directions 246 and 248 for the footprint 230 in the world space using geometry of the virtual environment 200 (shown in FIG. 2D). The filter directions 246 and 248 may correspond to a direction of the point 216 to the light source 206 and may be used to determine one or more of filter directions 136 and 138 of the filter 120 in image space of the screen 204. By computing one or more of the filter directions of the filter 120 using geometry of the virtual environment 200, the filter directions may accurately reflect the directional nature of light from the light source 206 across the region around the point 216.

To determine properties (e.g., dimensions) of the filter 120 (e.g., a dimension(s), size, shape, orientation, etc.), the geometry determiner 104 may determine (e.g., compute) at least one geometry that corresponds to the 3D shape 220 projected from (e.g., in a direction of) the light source 206 of the virtual environment 200 toward (e.g., to) the point 216 in the virtual environment 200. In some examples, the point 216 may be determined using the ray 214 as part of sampling the lighting conditions for the pixel 212 with respect to the light source 206. In these examples, the point 216 may be associated with one or more shadow rays, such as the ray 218. In other examples, the ray 214 may not have been used to determine lighting conditions with respect to the light source 206. In any example, rays, such as the ray 214 and the ray 218 may be used to test the visibility a point (e.g., the point 216) with respect to the camera 202 and the light source 206, and a filter (e.g., the filter 120) may only be determined for points that are determined to be visible.

In various examples, geometry that corresponds to the 3D shape 220 may be determined based at least in part on geometry of the light source 206 and/or a type of the light source 206. The light source 206 in FIGS. 2A-2D is an example of a directional or infinite light source. Where the light source 206 is a directional or infinite light source, the geometry of the 3D shape 220 may be based at least in part on properties of the light source 206, such as the light direction of the light source 206 and the angular size of the light source 206. For example, the light direction of the light source 206 (e.g., corresponding to the ray 218) may define a direction of the 3D shape 220, and the angular size of the light source 206 may define a planar angle, $\theta$, of the 3D shape 220, which may also be a solid angle or a cone angle of the 3D shape 220 in the example of FIGS. 2A-2D. The planar angle may also be referred to as a coverage angle that defines coverage of the light source h respect to the point 216. In this example, the geometry of the 3D shape need not be computed, and may be extracted from defined properties of the light source 206. Thus, in some examples, the geometry determined (e.g., computed) by the geometry determiner 104 that corresponds to the 3D shape 220 may include at least a first geometry that defines cross-sectional regions of the 3D shape 220, such as the planar angle, θ, of the 3D shape 220, and the direction corresponding to the ray 218.

Referring to FIG. 2B, the geometry determiner 104 may determine (e.g., compute) at least a second geometry that corresponds to a cross-section 232 (or more generally a section) of the 3D shape 220 based at least in part on the first geometry (e.g., the planar angle, θ) and a distance (e.g., of a length vector L) between the point 216 and the occluder 208 of the light source 206. For example, the second geometry may comprise one or more dimensions of the footprint 230, which may correspond to one or more dimensions of the cross-section 232. In some examples, the geometry determiner 104 may compute the second geometry based at least in part on inverting the 3D shape 220 using the planar angle, θ, the direction of the ray 218, and/or other geometry of the 3D shape 220 to compute one or more dimensions of the cross-section 232. The 3D shape 220, as inverted, may correspond to a 3D shape 244 projected from a point 260 on the occluder 208 (e.g., a bottom surface 270 or a top surface 272 of the occluder 208 or other portion of or associated with the occluder 208 in some examples) to the surface 210, where the point 260 may correspond to an intersection between the ray 218 and the occluder 208. The length vector L may correspond to the portion of the ray 218 between the point 260 and the point 216.

In various examples, the dimension(s) of the cross-section 232 may be computed based at least in part on the planar angle, θ, the length vector, L, between the point 216 and the point 260 on the occluder 208, and a normal vector, N, of the surface 210 at the point 216). The dimension(s) of the footprint 230 may be based at least in part on the computed dimension(s) of the cross-section 232. For example, angle α may be the angle between the light direction and the receiver plane, and may be computed from the length vector, L, and the normal vector, N. A width 250 of the footprint 230 may be computed using equation (1), which follows, and a width 252 of the footprint 230 may also be computed using equation (2), which follows $$F2=2*L*\tan(\theta) \quad (1)$$

$$F1=F2/\sin(\alpha) \quad (2)$$

Where F1 is the width 252 and F2 is the width 250.

Thus, the dimension(s) of the cross-section 232 may be used as the dimension(s) of the footprint 230 and/or may be used to derive one or more dimensions of the footprint 230 (e.g., as described herein). In this way, the geometry determiner 104 may use geometry that corresponds to the cross-section 232 to define a size and/or a shape of the footprint 230 (e.g., the width 250, the width 252, and/or other geometry of the footprint 230).

The geometry determiner 104 may use the second geometry(ies) of the footprint 230 to determine (e.g., compute) one or more dimensions of the filter 120 in image space. For example, the geometry determiner 104 may project one or more geometries of the footprint 230 to the screen 204 along a view vector (e.g., the ray 214) toward the camera 202. This may include the geometry determiner 104 determining at least a third geometry of the filter 120 that corresponds to a cross-section of a projection 254 of the footprint 230 along a view vector towards a virtual camera of the virtual environment. For example, the dimension(s) of the cross-section may be used as the dimension(s) of the filter 120 and/or may be used to derive one or more dimensions of the filter 120.

Thus, the geometry determiner 104 may use geometry that corresponds to the footprint 230 to define a size and/or a shape of the filter 120. For example, the third geometry may define at least a first radius of the filter 120, or other geometry corresponding to a width 310 (labeled in FIG. 3A) of the filter 120. The third geometry may additionally or alternatively define at least a second radius of the filter 120, or other geometry corresponding to a width 320 (labeled in FIG. 3B) of the filter 120.

In various examples, the geometry determiner 104 may determine the size of the filter 120 and/or one or more geometries thereof based at least in part on an amount of rays (e.g., ray-traced samples) used to determine lighting conditions for the pixel 132 and/or the pixel 212 with respect to the light source 206. For example, the present disclosure may provide for accurate soft shadows using a single ray-traced sample of a state of the virtual environment 200 that includes the ray 214 and the ray 218. Where more than one ray-traced sample is used, the geometry determiner 104 may compute the size and/or one or more geometries of the filter 120, such that the size and/or one or more geometries decrease based on (e.g., proportionally with) the number of samples (and/or shadow rays and/or eye rays). A suitable adjustment factor for the size and/or one or more geometries may be computed by the geometry determiner 104 as $1/\sqrt{n}$, where n is the number of ray-traced samples.

In some examples, the image renderer 102 uses at least one ray-traced sample of at least one previous state of the virtual environment 200 (e.g., each state may correspond to a rendered frame representative of the virtual environment 200) to determine lighting conditions for the pixel 132 and/or the pixel 212 at a subsequent state of the virtual environment 200. For example, any number of temporal ray-traced samples may be used to determine lighting conditions for the pixel 132 and/or the pixel 212 in addition to the one or more spatial or current ray-traced samples used to determine the lighting conditions for the pixel 132 and/or the pixel 212 (e.g., using a temporal filter that may use the geometry of the filter 120). Where a number of temporal ray-traced samples are used, those samples may be counted toward the number of rays-traced samples, n, or may otherwise be used to reduce the size and/or one or more geometries of the filter 120.

Using approaches described herein, the footprint 230 may elongate (e.g., linearly) as the distance between the point 216 and the occluder 208 increases along a direction of the light source 206, such that a size, orientation, and/or shape of the footprint 230 may accurately reflect contributions of the light source 206 to lighting conditions of the pixel 212, with a corresponding size, orientation, and/or shape resulting for the filter 120.

Referring now to FIG. 2D, FIG. 2D is a diagram illustrating an example of determining at least one filter direction (e.g., the filter direction 136 and/or the filter direction 138) for the filter 120, in accordance with some embodiments of the present disclosure. The present disclosure provides for determining at least one filter direction for a shadow denosing filter, such as the filter 120, in world space. For example, the geometry determiner 104 may determine (e.g., compute)

one or more of a filter direction 246 and a filter direction 248 in world space. The filter direction(s) may then be projected to image space (e.g. of the screen 204) to determine the filter direction 136 and/or the filter direction 138 of the filter 120 (e.g., similar to projecting the footprint 230 in FIG. 2C). The filter direction 248 may correspond to the filter direction 138 and the filter direction 246 may correspond to the filter direction 136.

The geometry determiner 104 may compute the filter direction 248, for example, by projecting a light direction vector v of the light source 206 (e.g., along the ray 218) to the receiver plane using the normal vector N. For example, where the filter direction 248 is û1, the geometry determiner 104 may compute the filter direction 248 using equation (3), which follows.

$$\hat{u}1 = \frac{v - (v \cdot N) * N}{|v - (v \cdot N) * N|} \quad (3)$$

Where the filter direction 246 is û2, the geometry determiner 104 may compute the filter direction 246 using equation (4), which follows.

$$\hat{u}2 = \text{cross}(N, \hat{u}1) \quad (4)$$

Thus, the filter direction 246 may be 90 degrees from the filter direction 248.

Thus, the filter direction 248 may correspond to a direction of the point 216 to the light source 206 to accurately reflect the directional nature of light from the light source 206 across the region around the point 216, with a corresponding filter direction 238 for the filter 120. For example, the filter 120 may be a separated cross-bilateral filter, with a different filter radius and filter weights per pixel.

The filter determiner 106 may use the dimension(s) of the filter 120 to determine a filter kernel for the filter 120. For example, the filter determiner 106 may form the filter kernel of the filter 120 with a first pixel width that corresponds to the width 310 computed for the filter 120 (e.g., corresponding to the filter direction 136). Additionally or alternatively, the filter determiner 106 may form the filter kernel of the filter 120 with a second pixel width that corresponds to the width 320 computed for the filter 120 (e.g., corresponding to the filter direction 138).

Referring now to FIG. 3A, FIG. 3A is a diagram illustrating an example of a graph 300A of filter weight values that may be determined by fitting a distribution function to the width 310 of the filter 120 along the filter direction 136, which may be used to determine filter weights for the filter 120, in accordance with some embodiments of the present disclosure.

The filter determiner 106 may compute filter weights for the filter 120 based at least in part on fitting a distribution function to the width 310 of the filter 120 along the filter direction 136, as indicated in FIG. 3A. The width 310 may span a pixel position 314 and a pixel position 316, with the pixel position 312 therebetween. The pixel position 312 may, for example, correspond to a midpoint or center of the filter kernel, and may be an initial pixel position to which the filter 120 is applied. For example, where the image filterer 108 applies the filter 120 to the pixel 212, the pixel 212 may correspond to the initial pixel position.

By fitting the distribution function to the width 310, the filter determiner 106 may compute the filter values of the filter 120 such that the filter values across the pixel positions of the width 310 substantially correspond to the distribution function or are otherwise based at least in part on the distribution function. For example, the distribution function of FIG. 3A may be a Gaussian distribution function in which the filter determiner 106 sets or maps the mean or center of the Gaussian distribution function to the pixel position 312. Thus, the pixel position 312 may be associated with a highest filter value.

The filter determiner 106 may also set or map one or more other points along the distribution function to one or more other pixel positions. For example, the filter determiner 106 may set or map a first position from the mean or center of the distribution function that corresponds to one or more standard deviations (or other distance) from the mean or center to the pixel position 314. Similarly, the filter determiner 106 may set or map a second position from the mean or center of the distribution function that corresponds to one or more standard deviations (or other distance) from the mean or center to the pixel position 316. In the example shown, the pixel position 314 and the pixel position 316 may each be associated with a lowest filter value along the width 310 due to using a Gaussian distribution function. The positions of the pixel position 314 and the pixel position 316 with respect to the distribution function are shown as examples in FIG. 3A, and may vary. For example, the pixel position 314 and the pixel position 316 may be associated with different filter values with respect to one another.

Referring now to FIG. 3B, FIG. 3B is a diagram illustrating an example of a graph 300B of filter weight values that may be determined by fitting a distribution function to the width 320 of the filter 120 along the filter direction 138, which may be used to determine filter weights for the filter 120, in accordance with some embodiments of the present disclosure. The graph 300A may be depicted at the same scale as the graph 300B The filter determiner 106 may compute filter weights for the filter 120 based at least in part on fitting a distribution function to the width 320 of the filter 120 along the filter direction 138, as indicated in FIG. 3B. The width 320 may span a pixel position 324 and a pixel position 326, with the pixel position 312 therebetween.

By fitting the distribution function to the width 320, the filter determiner 106 may compute the filter values of the filter 120 such that the filter values across the pixel positions of the width 320 substantially correspond to the distribution function or are otherwise based at least in part on the distribution function. For example, the distribution function of FIG. 3B may be a Gaussian distribution function, similar to FIG. 3A, in which the filter determiner 106 sets or maps the mean or center of the Gaussian distribution function to the pixel position 312. In other examples, different distribution functions may be fit to different filter directions for determining filter weights of the filter 120. The distribution function(s) may capture the relative contribution of lighting conditions of adjacent pixels to the pixel at the initial pixel position (e.g., the pixel 212), such that lighting information may be appropriately shared with the pixels. For example, the farther the pixel from the initial pixel position, the less likely it is to contribute to the lighting conditions of the pixel at the initial pixel position.

The filter determiner 106 may also set or map one or more other points along the distribution function to one or more other pixel positions. For example, the filter determiner 106 may set or map a first position from the mean or center of the distribution function that corresponds to one or more standard deviations (or other distance) from the mean or center to the pixel position 314. Similarly, the filter determiner 106 may set or map a second position from the mean or center of the distribution function that corresponds to one or more standard deviations (or other distance) from the mean or center to the pixel position 316. In the example shown, the pixel position 324 and the pixel position 326 may each be associated with a lowest filter value along the width 320 due to using a Gaussian distribution function. The positions of the pixel position 324 and the pixel position 326 with respect to the distribution function are shown as examples in FIG. 3B, and may vary. For example, the pixel position 324 and the pixel position 326 may be associated with different filter values with respect to one another. In the example of FIGS. 3A and 3B, the distribution of filter weight values along the width 320 may be more spread out than along the width 310 based at least in part on the width 320 being greater than the width 310 (e.g., because the Gaussian distribution function is mapped in a similar way to each width). Further, it is noted that while a distribution(s) may be used to determine the filter weights, one or more of the filter weights may not follow the distribution. For example, where the normal for a pixel at a pixel position is significantly different from the pixel at the initial pixel position (indicating they may face different directions), the filter weight value for that pixel position may be reduced and/or set to zero.

Figure 4:
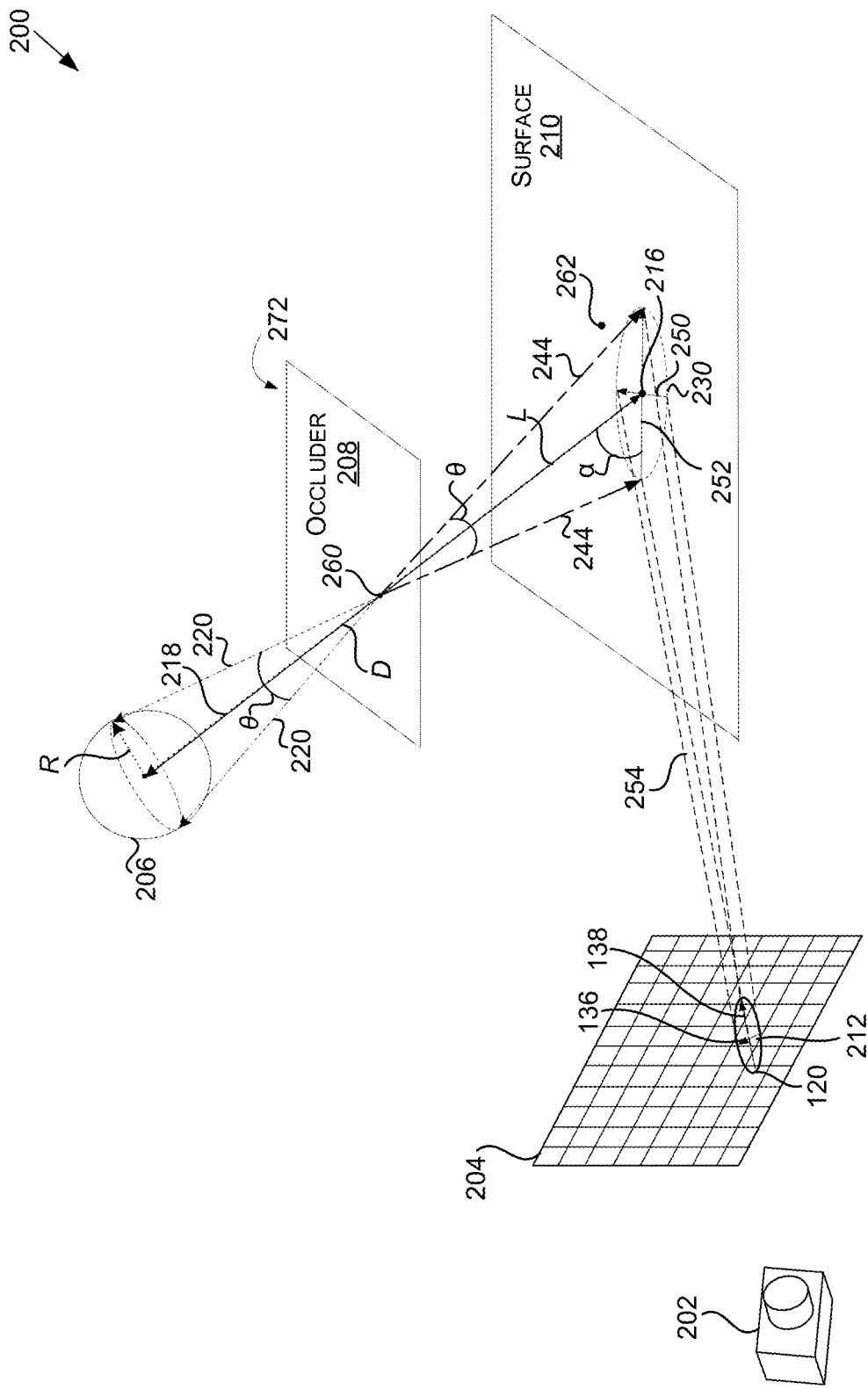
FIG. 4 is a diagram illustrating an example of using geometries of a virtual environment to determine a filter for denoising soft shadows based at least in part on a spherical light source, in accordance with some embodiments of the present disclosure.
Figure 5:
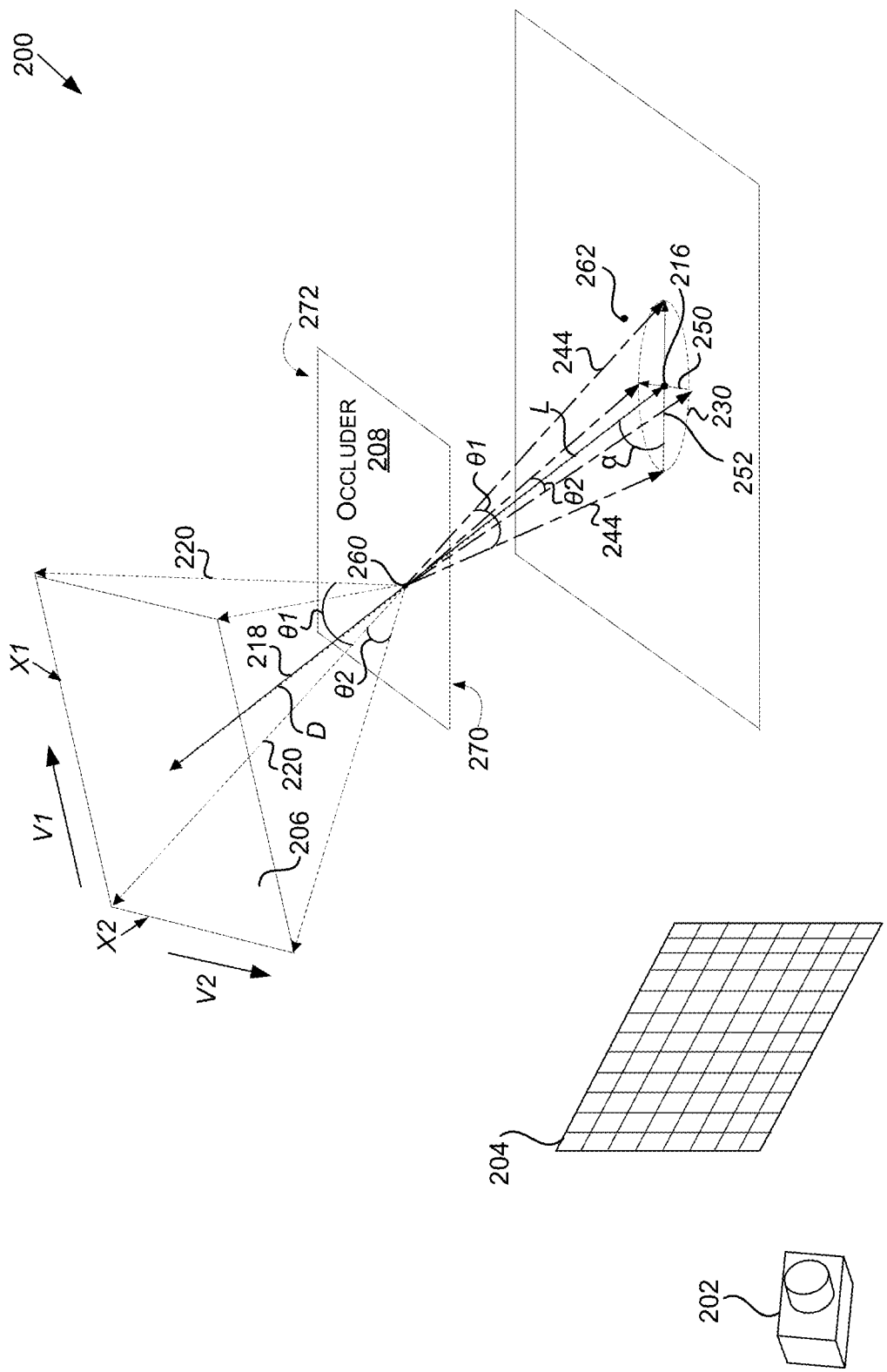
FIG. 5 is a diagram illustrating an example of using geometries of a virtual environment to determine a filter for denoising soft shadows based at least in part on a rectangular light source, in accordance with some embodiments of the present disclosure.

While FIGS. 2A-2D show an example of determining the filter 120 where the light source 206 may be a directional or infinite light source, FIG. 4 and FIG. 5 show examples of determining the filter 120 where the light source 206 may be a local light source. Referring now to FIGS. 4 and 5, FIG. 4 is a diagram illustrating an example of using geometries of the virtual environment 200 to determine the filter 120 for denoising soft shadows based at least in part on a spherical light source (or more generally an elliptical light source), in accordance with some embodiments of the present disclosure. FIG. 5 is a diagram illustrating an example of using geometry of the virtual environment 200 to determine the filter 120 for denoising soft shadows based at least in part on a rectangular light source, in accordance with some embodiments of the present disclosure.

The filter 120 may be determined similarly for a local light source as for a directional light source, which is shown in FIGS. 2A-2D. However, the geometry of the 3D shape 220 may be computed based at least in part on geometry of the light source 206. For example, instead of using a constant planar angle, θ, which may be specified in the lighting properties of the light source 206, the geometry determiner 104 may compute at least one planar angle, for each point in the virtual environment on a surface (e.g., the point 216) and/or each pixel of the screen 204 (e.g., the pixel 212). For example, for the spherical light source of FIG. 4, the geometry determiner 104 may compute the planar angle, θ, based at least in part on a radius vector R of the light source 206.

In some examples, for a local light source, the geometry determiner 104 may determine (e.g., compute) the planar angle, θ, with respect to the point 260 (e.g., on the top surface 272 or the bottom surface 270 of the occluder 208 or other portion of or associated with the occluder 208 in some examples). For example, the 3D shape 220 that defines the planar angle, θ (and/or other first geometry computed by the geometry determiner 104), may be projecting to the light source 206 of the virtual environment 200 from the point 260 in the virtual environment 200. For example, for FIG. 4, the geometry determiner 104 may determine a distance vector D between the occluder 208 and the light source 206 (e.g., between the point 260 and a center of the light source 206). The geometry determiner 104 may further use the distance vector D to compute the planar angle, θ, using equation (5), which follows.

$$\theta = \arcsin(R, D) \tag{5}$$

The distance vector D and/or the length vector L may correspond to the ray 218, as shown, or may correspond to another shadow vector from the point 216 to the light source 206. Thus, the ray 218 may not necessarily intersect the center of the light source 206 and the footprint 230 may not necessarily be centered at the point 216. Further, where multiple shadow rays are used to sample lighting condition data with respect to the point 216, the ray 218 used to determine the footprint 230 may be selected as the shadow ray with the shortest distance to the occluder 208. The filter 120 of FIG. 4 may otherwise be determined similar as described with respect to FIGS. 2A-2D.

As the light source 206 of FIG. 5 is rectangular, the geometry determiner 104 may compute a planar angle θ1 to capture the coverage of the light source 206 along one side of the light source 206 and a planar angle θ2 to capture the coverage of the light source 206 along the other side of the light source 206 in order to determine the footprint 230. While the projection of the light source 206 for FIG. 4 may form a cone, the projection of the light source 206 for FIG. 5 may form a pyramid. Similarly, other types and/or shapes of light sources may result in other 3D shapes.

The planar angle θ1 may be computed using equations (6), (7), and (8), which follows.

$$p = \cos(v1, t) \tag{6}$$

$$x1\_p = x1 * \mathrm{sqrt}(1 - p*p) \tag{7}$$

$$\theta1 = \arctan(x1\_p/D) \tag{8}$$

The planar angle θ2 may be similarly computed using x2 and v2 in place of x1 and v1, where x1 and x2 may be edge lengths of the light source 206, v1 and v2 may be tangent vectors of the light source 206, D may be a distance from the point 260 to a center of the light source 206 (similar to FIG. 4), and lay be the unit vector to the center of the light source 206.

A width 250 of the footprint 230 may be computed using equation (9), which follows, and a width 252 of the footprint 230 may also be computed using equation (10), which follows $$F1 = 2*L*\tan(\theta1)/\sin(\alpha) \tag{9}$$

$$F2 = 2*L*\tan(\theta2) \tag{10}$$

Where F1 is the width 252 and F2 is the width 250. The filter 120 of FIG. 5 may otherwise be determined similar as described with respect to FIGS. 2A-2D.

In any example, to determine any of the various geometry described herein, the geometry determiner 104 may leverage image render data used by the image renderer 102 to render image data for the image 114 and/or the image 116. Examples include hit distance data, scene depth data, world normal, and light source sizes and directions. For example, the geometry determiner 104 may use hit distance data from a hit distance buffer to determine one or more distances used to compute geometry of the filter 120, any of which may be from a geometry buffer used to render the image 116. Examples include the distance between the point 216 and the occluder 208 and/or between the point 216 and the light source 206 (e.g., a ray hit distance). Further, the geometry determiner 104 may use scene depth data from a depth buffer to determine one or more distances used to compute geometry of the filter 120. An example includes one or more distances between the screen 204 and the footprint 230.

Figure 6:
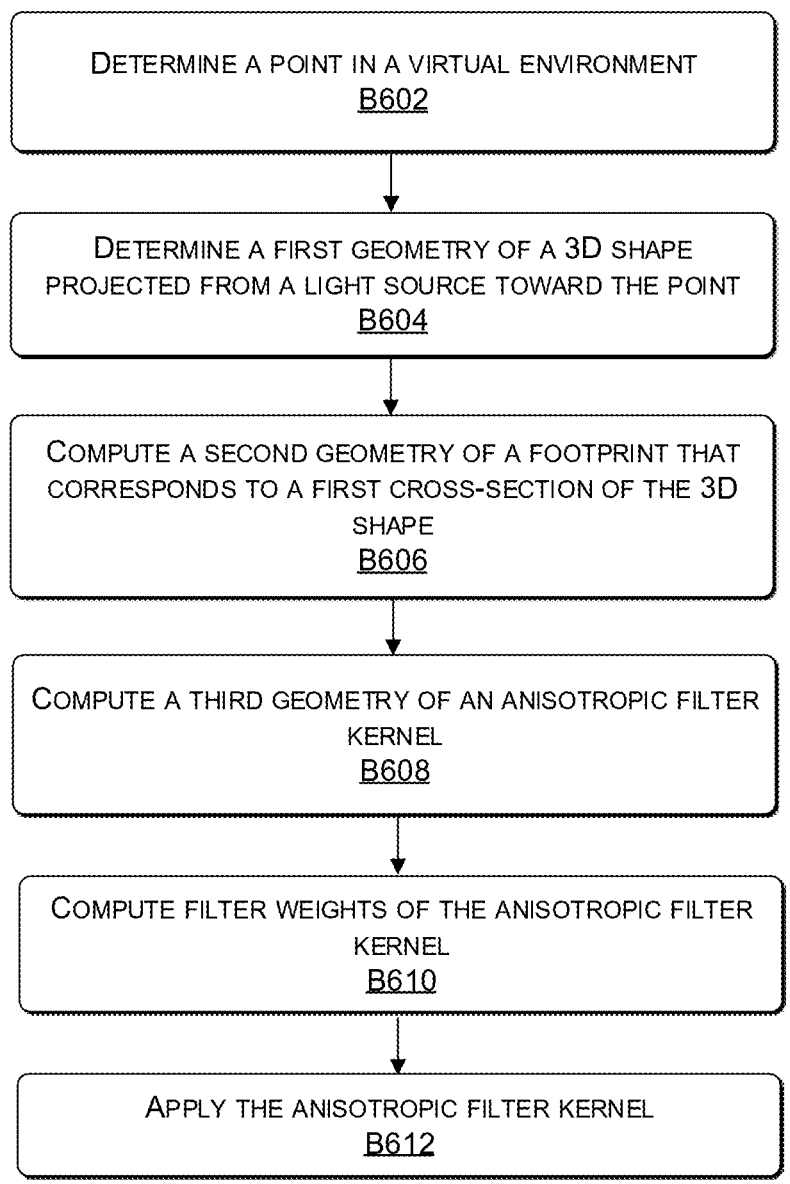
FIG. 6 is a flow diagram showing a method for determining a filter for denoising soft shadows, in accordance with some embodiments of the present disclosure.
Figure 8:
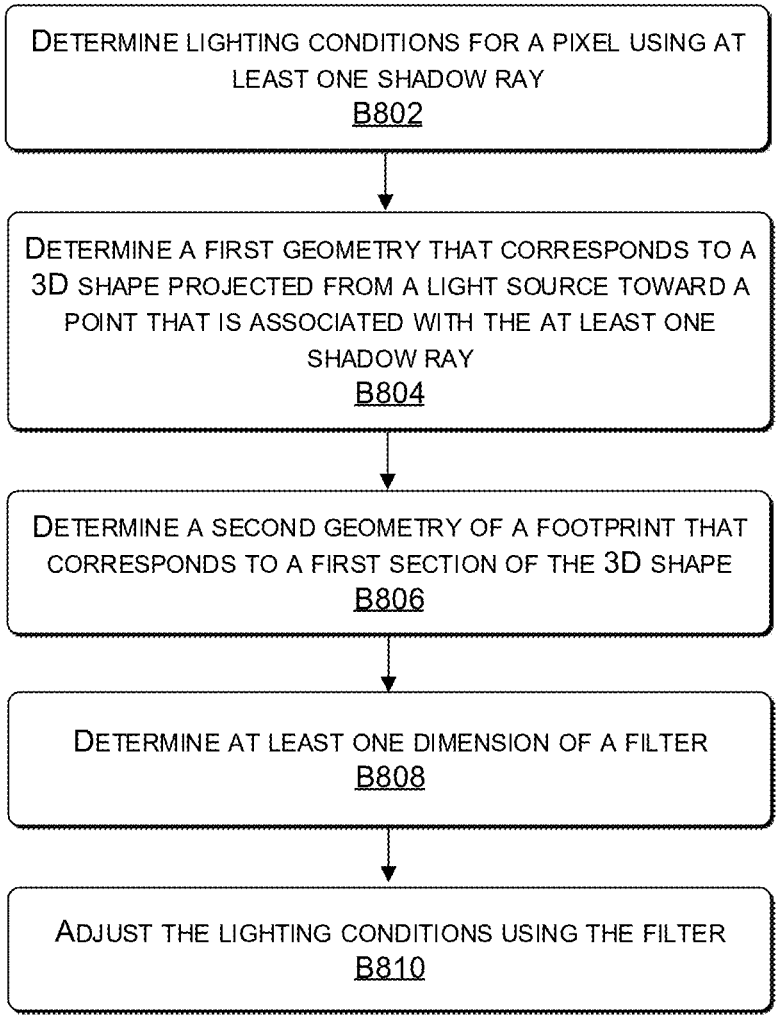
FIG. 8 is a flow diagram showing a method for determining a filter for denoising soft shadows, in accordance with some embodiments of the present disclosure.

Now referring to FIGS. 6-8, each block of methods 600, 700, and 800, and other methods described herein, comprises a computing process that may be performed using any combination of hardware, firmware, and/or software. For instance, various functions may be carried out by a processor executing instructions stored in memory. The methods may also be embodied as computer-usable instructions stored on computer storage media. The methods may be provided by a standalone application, a service or hosted service (standalone or in combination with another hosted service), or a plug-in to another product, to name a few. In addition, the methods 600, 700, and 800 are described, by way of example, with respect to the shadow denoising system 100 (FIG. 1). However, these methods may additionally or alternatively be executed by any one system, or any combination of systems, including, but not limited to, those described herein.

FIG. 6 is a flow diagram showing the method 600 for determining a filter for denoising soft shadows, in accordance with some embodiments of the present disclosure. The method 600 may apply to the examples of any of FIGS. 2A-2C, 4, or 5, or other examples. The method 600, at block B602, includes determining a point in a virtual environment. For example, the image renderer 102 may determine the point 216 on the surface 210 of the virtual environment 200. The point 216 may be visible to the camera 202 and may be in a virtual light path (e.g., comprising the ray 214 and the ray 218) that projects from the pixel 212 of the screen 204 of the virtual environment 200 to the point 216 on the surface 210, and reflects from the point 216 on the surface 210 through the occluder 208 to intersect the light source 206 of the virtual environment 200.

The method 600, at block B604, includes determining a first geometry of a 3D shape projected from a light source toward the point. For example, the geometry determiner 104 may compute the planar angle, θ, of the 3D shape 220 projected from the light source 206 toward the point 216 in the virtual environment 200.

The method 600, at block B606, includes computing a second geometry of a footprint that corresponds to a first cross-section of the 3D shape. For example, the geometry determiner 104 may compute the width 250 and/or the width 252 based at least in part on a distance between the point 216 and the occluder 208.

The method 600, at block B608, includes computing a third geometry of an anisotropic filter kernel. For example, the geometry determiner 104 may compute the width 310 and/or the width 310 of the filter 120 (e.g., of an anisotropic filter kernel thereof)—that corresponds to a second cross-section of the projection 254 of the footprint 230 along a view vector (e.g., the ray 214) of the point 216 to the pixel 212—based at least in part on the width 250 and/or the width 252.

The method 600, at block B610, includes computing filter weights of the anisotropic filter kernel. For example, the filter determiner 106 may compute filter weights of the anisotropic filter kernel of the filter 120 along at least the filter direction 136 and/or the filter direction 138 based at least in part on the width 310 and/or the width 320.

The method 600, at block B612, includes applying the anisotropic filter kernel. For example, the image filterer 108 may apply the filter 120 to the pixel 132 in the image 114 that is representative of the screen 204, where the pixel 132 corresponds to the pixel 212.

FIG. 7 is a flow diagram showing a method 700 for determining a filter for denoising soft shadows, in accordance with some embodiments of the present disclosure. The method 700 may apply to the examples of any of FIGS. 2A-2C, 4, or 5, or other examples. The method 700, at block B702, includes determining a first geometry that corresponds to a 3D shape projected from a light source toward a point. For example, the geometry determiner 104 may determine the planar angle, θ, of the 3D shape 220 projected from the light source 206 toward the point 216 in the virtual environment 200.

The method 700, at block B704, includes determining a second geometry of a footprint that corresponds to a first section of the 3D shape. For example, the geometry determiner 104 may determine the width 250 and/or the width 252 of the footprint 230 that corresponds to a section of the 3D shape 220 based at least in part on a distance between the point 216 and the occluder 208.

The method 700, at block B706, includes determining at least one dimension of a filter. For example, the geometry determiner 104 and/or the image filterer 108 may determine one or more of the width 310, the width 310, or the filter weight values of the filter 120—based at least in part on the width 250 and/or the width 252 of the footprint 230.

The method 700, at block B708, includes applying the filter to an image of a virtual environment. For example, the image filterer 108 may apply the filter 120 to the image 114 of the virtual environment 200 at a location (e.g., a location or pixel position in the image 114, such as the pixel 132) that corresponds to the view vector.

FIG. 8 is a flow diagram showing a method 800 for determining a filter for denoising soft shadows, in accordance with some embodiments of the present disclosure. The method 800 may apply to the examples of any of FIGS. 2A-2C, 4, or 5, or other examples. The method 800, at block B802, includes determining lighting conditions for a pixel using at least one shadow ray. For example, the image renderer 102 may determine lighting conditions for the pixel 132 of the image 116 or the image 114 of the virtual environment 200 using a shadow ray (e.g., the ray 218) that extends from the surface 210 in the virtual environment 200 towards the light source 206.

The method 800, at block B804, includes determining a first geometry that corresponds to a 3D shape projected from a light source toward a point that is associated with the at least one shadow ray. For example, the geometry determiner 104 may determine the planar angle, θ, of the 3D shape 220 projected from the light source 206 toward the point 216 in the virtual environment 200.

The method 800, at block B806, includes determining a second geometry of a footprint that corresponds to a first section of the 3D shape. For example, the geometry determiner 104 may determine the width 250 and/or the width 252 of the footprint 230 that corresponds to a section of the 3D shape 220 based at least in part on a distance between the point 216 and the occluder 208.

The method 800, at block B808, includes determining at least one dimension of a filter. For example, the geometry determiner 104 and/or the image filterer 108 may determine one or more of the width 310, the width 310, or the filter weight values of the filter 120—based at least in part on the width 250 and/or the width 252 of the footprint 230.

The method 800, at block B810, includes adjusting the lighting conditions for the pixel using the filter. For example, the image filterer 108 may apply the filter 120 to image data representative of the virtual environment 200 to produce the image 116.

Figure 9:
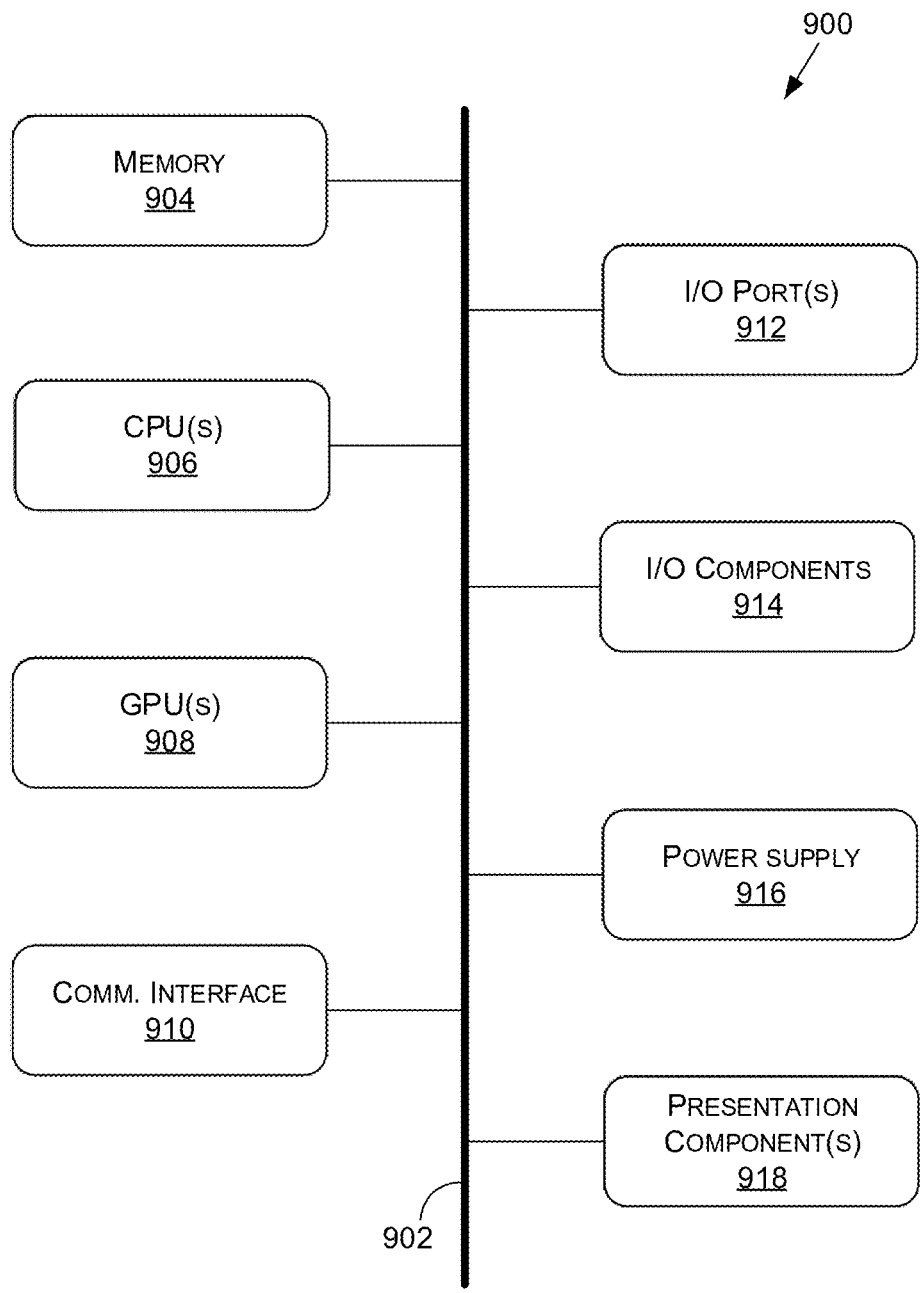
FIG. 9 is a block diagram of an example computing environment suitable for use in implementing some embodiments of the present disclosure.

FIG. 9 is a block diagram of an example computing device 900 suitable for use in implementing some embodiments of the present disclosure. Computing device 900 may include a bus 902 that directly or indirectly couples the following devices: memory 904, one or more central processing units (CPUs) 906, one or more graphics processing units (GPUs) 908, a communication interface 910, input/output (I/O) ports 912, input/output components 914, a power supply 916, and one or more presentation components 918 (e.g., display(s)).

Although the various blocks of FIG. 9 are shown as connected via the bus 902 with lines, this is not intended to be limiting and is for clarity only. For example, in some embodiments, a presentation component 918, such as a display device, may be considered an I/O component 914 (e.g., if the display is a touch screen). As another example, the CPUs 906 and/or GPUs 908 may include memory (e.g., the memory 904 may be representative of a storage device in addition to the memory of the GPUs 908, the CPUs 906, and/or other components). In other words, the computing device of FIG. 9 is merely illustrative. Distinction is not made between such categories as "workstation," "server," "laptop," "desktop," "tablet," "client device," "mobile device," "hand-held device," "game console," "electronic control unit (ECU)," "virtual reality system," and/or other device or system types, as all are contemplated within the scope of the computing device of FIG. 9.

The bus 902 may represent one or more busses, such as an address bus, a data bus, a control bus, or a combination thereof. The bus 902 may include one or more bus types, such as an industry standard architecture (ISA) bus, an extended industry standard architecture (EISA) bus, a video electronics standards association (VESA) bus, a peripheral component interconnect (PCI) bus, a peripheral component interconnect express (PCIe) bus, and/or another type of bus.

The memory 904 may include any of a variety of computer-readable media. The computer-readable media may be any available media that may be accessed by the computing device 900. The computer-readable media may include both volatile and nonvolatile media, and removable and non-removable media. By way of example, and not limitation, the computer-readable media may comprise computer-storage media and communication media.

The computer-storage media may include both volatile and nonvolatile media and/or removable and non-removable media implemented in any method or technology for storage of information such as computer-readable instructions, data structures, program modules, and/or other data types. For example, the memory 904 may store computer-readable instructions (e.g., that represent a program(s) and/or a program element(s), such as an operating system. Computer-storage media may include, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which may be used to store the desired information and which may be accessed by computing device 900. As used herein, computer storage media does not comprise signals per se.

The computer storage media may embody computer-readable instructions, data structures, program modules, and/or other data types in a modulated data signal such as a carrier wave or other transport mechanism and includes any information delivery media. The term "modulated data signal" may refer to a signal that has one or more of its characteristics set or changed in such a manner as to encode information in the signal. By way of example, and not limitation, the computer storage media may include wired media such as a wired network or direct-wired connection, and wireless media such as acoustic, RF, infrared and other wireless media. Combinations of any of the above should also be included within the scope of computer-readable media.

The CPU(s) 906 may be configured to execute the computer-readable instructions to control one or more components of the computing device 900 to perform one or more of the methods and/or processes described herein. The CPU(s) 906 may each include one or more cores (e.g., one, two, four, eight, twenty-eight, seventy-two, etc.) that are capable of handling a multitude of software threads simultaneously. The CPU(s) 906 may include any type of processor, and may include different types of processors depending on the type of computing device 900 implemented (e.g., processors with fewer cores for mobile devices and processors with more cores for servers). For example, depending on the type of computing device 900, the processor may be an Advanced RISC Machines (ARM) processor implemented using Reduced Instruction Set Computing (RISC) or an x86 processor implemented using Complex Instruction Set Computing (CISC). The computing device 900 may include one or more CPUs 906 in addition to one or more microprocessors or supplementary co-processors, such as math co-processors.

The GPU(s) 908 may be used by the computing device 900 to render graphics (e.g., 3D graphics). The GPU(s) 908 may include hundreds or thousands of cores that are capable of handling hundreds or thousands of software threads simultaneously. The GPU(s) 908 may generate pixel data for output images in response to rendering commands (e.g., rendering commands from the CPU(s) 906 received via a host interface). The GPU(s) 908 may include graphics memory, such as display memory, for storing pixel data. The display memory may be included as part of the memory 904. The GPU(s) 908 may include two or more GPUs operating in parallel (e.g., via a link). When combined together, each GPU 908 may generate pixel data for different portions of an output image or for different output images (e.g., a first GPU for a first image and a second GPU for a second image). Each GPU may include its own memory, or may share memory with other GPUs.

The communication interface 910 may include one or more receivers, transmitters, and/or transceivers that enable the computing device 900 to communicate with other computing devices via an electronic communication network, included wired and/or wireless communications. The communication interface 910 may include components and functionality to enable communication over any of a number of different networks, such as wireless networks (e.g., Wi-Fi, Z-Wave, Bluetooth, Bluetooth LE, ZigBee, etc.), wired networks (e.g., communicating over Ethernet), low-power wide-area networks (e.g., LoRaWAN, SigFox, etc.), and/or the Internet.

The I/O ports 912 may enable the computing device 900 to be logically coupled to other devices including the I/O components 914, the presentation component(s) 918, and/or other components, some of which may be built in to (e.g., integrated in) the computing device 900. Illustrative I/O components 914 include a microphone, mouse, keyboard, joystick, game pad, game controller, satellite dish, scanner, printer, wireless device, etc. The I/O components 914 may provide a natural user interface (NUI) that processes air gestures, voice, or other physiological inputs generated by a user. In some instances, inputs may be transmitted to an appropriate network element for further processing. An NUI may implement any combination of speech recognition, stylus recognition, facial recognition, biometric recognition, gesture recognition both on screen and adjacent to the screen, air gestures, head and eye tracking, and touch recognition (as described in more detail below) associated with a display of the computing device 900. The computing device 900 may be include depth cameras, such as stereoscopic camera systems, infrared camera systems, RGB camera systems, touchscreen technology, and combinations of these, for gesture detection and recognition. Additionally, the computing device 900 may include accelerometers or gyroscopes (e.g., as part of an inertia measurement unit (IMU)) that enable detection of motion. In some examples, the output of the accelerometers or gyroscopes may be used by the computing device 900 to render immersive augmented reality or virtual reality.

The power supply 916 may include a hard-wired power supply, a battery power supply, or a combination thereof. The power supply 916 may provide power to the computing device 900 to enable the components of the computing device 900 to operate.

The presentation component(s) 918 may include a display (e.g., a monitor, a touch screen, a television screen, a heads-up-display (HUD), other display types, or a combination thereof), speakers, and/or other presentation components. The presentation component(s) 918 may receive data from other components (e.g., the GPU(s) 908, the CPU(s) 906, etc.), and output the data (e.g., as an image, video, sound, etc.).

The disclosure may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The disclosure may be practiced in a variety of system configurations, including hand-held devices, consumer electronics, general-purpose computers, more specialty computing devices, etc. The disclosure may also be practiced in distributed computing environments where tasks are performed by remote-processing devices that are linked through a communications network.

As used herein, a recitation of "and/or" with respect to two or more elements should be interpreted to mean only one element, or a combination of elements. For example, "element A, element B, and/or element C" may include only element A, only element B, only element C, element A and element B, element A and element C, element B and element C, or elements A, B, and C. In addition, "at least one of element A or element B" may include at least one of element A, at least one of element B, or at least one of element A and at least one of element B.

The subject matter of the present disclosure is described with specificity herein to meet statutory requirements. However, the description itself is not intended to limit the scope of this disclosure. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

What is claimed is:

1. A method comprising:
    determining a point on a surface of a virtual environment that is visible to a virtual camera and is in a virtual light path that projects from a virtual pixel of a virtual screen of the virtual environment to the point on the surface, and reflects from the point on the surface through an occluder to intersect a light source of the virtual environment;
    determining a first geometry of a three dimensional (3D) shape projected from the light source toward the point in the virtual environment;
    computing a second geometry based at least in part on the first geometry and a distance between the point and the occluder, the second geometry being of a footprint that corresponds to a first cross-section of the 3D shape;
    computing a third geometry based at least in part on the second geometry, the third geometry being of an anisotropic filter kernel that corresponds to a second cross-section of a projection of the footprint along a view vector of the point to the virtual pixel;
    based at least in part on the third geometry, computing filter weights of the anisotropic filter kernel along at least a first direction and a second direction; and
    applying the anisotropic filter kernel to a pixel in an image that is representative of the virtual screen, the pixel in the image corresponding to the virtual pixel.

2. The method of claim 1, wherein the distance between the point and the occluder corresponds to an intersection between a portion of the virtual light path that extends from the point and a surface of the occluder that is on an opposite side of the occluder with respect to the light source.

3. The method of claim 1, wherein the computing of the second geometry is further based at least in part on a normal vector of the surface at the point.

4. The method of claim 1, wherein the determining of the first geometry of the 3D shape is based at least in part on geometry of the light source, and the geometry of the light source defines a shape of the first cross-section of the 3D shape.

5. The method of claim 1, wherein the computing of the filter weights along the first direction comprises fitting a distribution function to the anisotropic filter kernel along the first direction.

6. The method of claim 1, wherein the anisotropic filter kernel extends farther in the first direction than the second direction.

7. The method of claim 1, further comprising identifying a type of the light source, wherein the determining of the first geometry of the 3D shape is based at least in part on the type of the light source that is identified.

8. The method of claim 1, wherein the light source is an elliptical light source and the 3D shape is a cone.

9. The method of claim 1, wherein the light source is a rectangular light source and the 3D shape is a pyramid.

10. A method comprising:
    determining a first geometry that corresponds to a three dimensional (3D) shape projected from a light source of a virtual environment toward a point in the virtual environment;
    determining a second geometry based at least in part on the first geometry and a distance between the point and an occluder of the light source, the second geometry being of a footprint that corresponds to a first section of the 3D shape;

based at least in part on the second geometry, determining at least one dimension of a filter that corresponds to the footprint; and applying the filter to an image of the virtual environment at a location that corresponds to a view vector of the point towards a virtual camera of the virtual environment.

11. The method of claim 10, where the determining of the first geometry that corresponds to the 3D shape is based at least in part on geometry of the light source, and the geometry of the light source defines a shape of the first section of the 3D shape.

12. The method of claim 10, wherein a size of the filter extends farther along a first axis than along a second axis.

13. The method of claim 10, wherein the filter comprises an anisotropic filter kernel.

14. The method of claim 10, wherein the view vector is of a ray-traced sample that corresponds to a virtual pixel of a virtual screen of the virtual environment.

15. A method comprising:

determining lighting conditions for a pixel of an image of a virtual environment using at least one shadow ray that extends from a surface in the virtual environment towards a light source;

determining a first geometry that corresponds to a three dimensional (3D) shape projected from the light source toward a point on the surface that is associated with the at least one shadow ray;

determining a second geometry of a footprint that corresponds to a first section of the 3D shape based at least in part on the first geometry and a distance between the point and an occluder of the light source;

based at least in part on the second geometry, determining at least one dimension of a filter; and adjusting the lighting conditions for the pixel of the image using the filter.

16. The method of claim 15, further comprising generating the image comprising the pixel, wherein the lighting conditions of the pixel with respect to the light source is based on a single ray-traced sample of a state of the virtual environment represented in the image, the single ray-traced sample comprising a single eye ray and a single shadow ray.

17. The method of claim 15, wherein the at least one dimension of the filter is further based at least in part on an amount of ray-traced samples of a state of the virtual environment used to determine the lighting conditions for the pixel with respect to the light source.

18. The method of claim 15, wherein the light source is a directional light source and the 3D shape is a cone.

19. The method of claim 15, wherein the determining of the second geometry of the footprint is based at least in part on determining the distance using a hit distance buffer used to render the image.

20. The method of claim 15, wherein the filter is a separated cross-bilateral filter.

* * * * *